United States Patent
Knijnik et al.

(10) Patent No.: US 10,970,742 B1
(45) Date of Patent: Apr. 6, 2021

(54) SYSTEMS AND METHODS FOR OPTIMIZATION OF CAPITAL ALLOCATION FOR ADVERTISING CAMPAIGNS IN ONLINE-BASED COMMERCE

(71) Applicants: Daniel Knijnik, Old Greenwich, CT (US); Anibal Knijnik, Porto Alegre (BR); Eduardo Knijnik, Riverside, CT (US)

(72) Inventors: Daniel Knijnik, Old Greenwich, CT (US); Anibal Knijnik, Porto Alegre (BR); Eduardo Knijnik, Riverside, CT (US)

(73) Assignee: Quartile Digital, Inc., New York, NY (US)

( * ) Notice: Subject to any disclaimer, the term of this patent is extended or adjusted under 35 U.S.C. 154(b) by 0 days.

(21) Appl. No.: 16/249,465

(22) Filed: Jan. 16, 2019

Related U.S. Application Data

(60) Provisional application No. 62/617,659, filed on Jan. 16, 2018.

(51) Int. Cl.
*G06Q 30/02* (2012.01)
*G06N 20/00* (2019.01)

(52) U.S. Cl.
CPC ......... *G06Q 30/0253* (2013.01); *G06N 20/00* (2019.01); *G06Q 30/0275* (2013.01); *G06Q 30/0276* (2013.01)

(58) Field of Classification Search
CPC ........... G06Q 30/0253; G06Q 30/0275; G06Q 30/0276; G06N 20/00

(Continued)

(56) References Cited

U.S. PATENT DOCUMENTS

2007/0027754 A1  2/2007  Collins et al.
2011/0246267 A1  10/2011  Williams et al.
(Continued)

FOREIGN PATENT DOCUMENTS

WO   WO-2016007382 A1 *  1/2016  ......... G06F 16/3337

OTHER PUBLICATIONS

Sunil Gupta, Allocating Marketing Resources, 2008 (Year: 2008).*
(Continued)

*Primary Examiner* — Tarek Elchanti
(74) *Attorney, Agent, or Firm* — Pryor Cashman LLP

(57) ABSTRACT

A method and associated system of producing an advertising campaign of a product for an online marketplace seller including, under control of one or more processors configured with executable instructions, generating a single keyword advertising campaign of the product; collecting data on the single keyword; executing a machine learning component of an adaptive machine learning platform to generate a machine learning component output based at least in part on the data on the single keyword; generating a behavioral curve or table relating to an advertisement bid value and a cost per click value based at least in part on the machine learning component output; generating sales goal(s) of the product for the online marketplace seller on the online marketplace; generating an optimized advertisement bid value based at least in part on the sales goal(s) and the behavioral curve or table; and generating an optimized advertising campaign therefrom.

22 Claims, 15 Drawing Sheets

(58) Field of Classification Search
USPC .................................................. 705/14.51
See application file for complete search history.

(56) References Cited

U.S. PATENT DOCUMENTS

| | | |
|---|---|---|
| 2011/0251875 A1 | 10/2011 | Cosman |
| 2013/0018722 A1 | 1/2013 | Libby |
| 2013/0036013 A1 | 2/2013 | James et al. |
| 2013/0138503 A1 | 5/2013 | Brown et al. |
| 2013/0282444 A1 | 10/2013 | Karlsson et al. |
| 2015/0066628 A1 | 3/2015 | Ghosh et al. |

OTHER PUBLICATIONS

Office Action dated Jul. 27, 2020 in connection with U.S. Appl. No. 16/281,443.
Office Action dated Jan. 28, 2021 in connection with U.S. Appl. No. 16/281,443.
Office Action dated Aug. 5, 2020 in connection with U.S. Appl. No. 16/281,420.

\* cited by examiner

| Targets ==> # Sales = 20, maximum ACoS = 27% | | |
|---|---|---|
| Solution | ACoS | # of Sales |
| 1 | 34% | 20 |
| 2 | 27% | 17 |

Fig. 17

Keyword 1

| BID ($) | CPC | # Clicks | Ads Spending | Conv Rate | # Sales Expected | Unit Sale Price | Total Sales | Average Cost of Sale | ACoS |
|---|---|---|---|---|---|---|---|---|---|
| 3.00 | 1.93 | 200 | 386.00 | 25.00% | 50.00 | 25.00 | 1,250.00 | 7.72 | 30.9% |
| 2.75 | 1.91 | 180 | 343.80 | 25.50% | 45.90 | 25.00 | 1,147.50 | 7.49 | 30.0% |
| 2.50 | 1.88 | 165 | 309.38 | 26.00% | 42.90 | 25.00 | 1,072.50 | 7.21 | 28.8% |
| 2.25 | 1.85 | 155 | 285.98 | 25.50% | 39.53 | 25.00 | 988.13 | 7.24 | 28.9% |
| 2.00 | 1.74 | 142 | 247.08 | 23.75% | 33.73 | 25.00 | 843.13 | 7.33 | 29.3% |
| 1.75 | 1.59 | 125 | 199.06 | 23.00% | 28.75 | 25.00 | 718.75 | 6.92 | 27.7% |
| 1.50 | 1.41 | 95 | 133.95 | 22.00% | 20.90 | 25.00 | 522.50 | 6.41 | 25.6% |
| 1.25 | 1.20 | 40 | 48.00 | 21.00% | 8.40 | 25.00 | 210.00 | 5.71 | 22.9% |
| 1.00 | 0.97 | 23 | 22.31 | 20.43% | 4.70 | 25.00 | 117.50 | 4.75 | 19.0% |

Keyword 2

| BID ($) | CPC | # Clicks | Ads Spending | Conv Rate | # Sales Expected | Unit Sale Price | Total Sales | Average Cost of Sale | ACoS |
|---|---|---|---|---|---|---|---|---|---|
| 2.50 | 1.61 | 135 | 217.13 | 23.75% | 32.06 | 25.00 | 801.56 | 6.77 | 27.1% |
| 2.25 | 1.56 | 112 | 175.03 | 23.00% | 25.76 | 25.00 | 644.00 | 6.79 | 27.2% |
| 2.00 | 1.50 | 98 | 147.00 | 22.00% | 21.56 | 25.00 | 539.00 | 6.82 | 27.3% |
| 1.75 | 1.44 | 73 | 104.76 | 21.00% | 15.33 | 25.00 | 383.25 | 6.83 | 27.3% |
| 1.50 | 1.31 | 65 | 84.83 | 18.00% | 11.70 | 25.00 | 292.50 | 7.25 | 29.0% |
| 1.25 | 1.14 | 55 | 62.56 | 17.50% | 9.63 | 25.00 | 240.63 | 6.50 | 26.0% |
| 1.00 | 0.94 | 43 | 40.42 | 17.50% | 7.53 | 25.00 | 188.13 | 5.37 | 21.5% |
| 0.75 | 0.85 | 34 | 28.90 | 16.00% | 5.44 | 25.00 | 136.00 | 5.31 | 21.3% |
| 0.70 | 0.68 | 22 | 14.94 | 15.00% | 3.30 | 25.00 | 82.50 | 4.53 | 18.1% |

SYSTEMS AND METHODS FOR OPTIMIZATION OF CAPITAL ALLOCATION FOR ADVERTISING CAMPAIGNS IN ONLINE-BASED COMMERCE

CROSS-REFERENCE TO RELATED APPLICATIONS

The present application claims priority to U.S. Provisional Patent Application No. 62/617,659, filed Jan. 16, 2018, the disclosures and teachings of which are incorporated herein by reference.

TECHNICAL FIELD

The present invention relates to systems and methods for optimizing capital allocation for advertising campaigns in the online-based commercial environment to achieve pre-defined sales goals while respecting inventory, advertising cost of sales, and advertising budget constraints in an autonomous manner.

BACKGROUND OF THE INVENTION

Selling goods through online marketplaces is becoming an increasingly important activity for retailers. The share of Internet sales in the total retail commerce space is continuously growing. E-commerce retailers, i.e., retailers that sell mainly through the Internet, face numerous challenges in managing their businesses, with one such challenge being obtaining a balanced ratio for every Universal Product Code (UPC) between advertising expenditure of an advertising campaign and the actual sales achieved through this campaign.

There are many aspects to consider regarding this balancing ratio, as the process of advertising is composed of at least some of these four basic steps:

1. Launching a campaign for a UPC through a search engine based on a list of words automatically generated by the marketplace, i.e., an automatic campaign. While a word is the most commonly-used target, a product target may also be utilized in connection with the present system and method disclosed herein. This list of words in the automatic campaign is proposed by the marketplace using its metrics and algorithms and are intended to catch the attention of potential customers looking for that particular UPC. The retailer bids a predefined maximum value to pay per click—the CPC or cost per click—and stipulates a maximum daily value to spend for the duration of the campaign.
2. Analyzing the results of that campaign regarding the number of impressions and clicks for each word, the CPC, and the number of clicks per sale, if any. The actual CPC, which almost always is smaller than the bid, is also informed daily by the marketplace during the advertising campaign.
3. Refining the campaign by bidding a maximum value to pay for each click of selected words (e.g., keywords) from the aforementioned list of words.
4. Balancing the campaign by adjusting the bid value for each word towards the actual CPC to reduce the Advertising Cost of Sales (ACoS), which is the ratio in percentage points of advertising expenditure to the revenue from actual total sales value, for that UPC while maintaining an acceptable number of sales.

One of the main problems of this process is that it is unknown upfront which words, phrases, or expressions will effectively produce a sale. Additionally, this process of selecting words, phrases, or expressions, i.e., refining, is typically performed manually by individuals analyzing word lists informed by the online marketplace, which is expensive, time-consuming, and demands a heavy amount of skilled manpower.

Search engines usually charge per click, so that its goal is to launch an automatic campaign with the broadest set of words related to the UPC, as it does not know in advance which word will attract the attention of the customer. For instance, for the UPC "Pet Stairs," a click can be obtained, among others, through the words "Pet," "Stairs," "Pet Stairs," "Dog stairs," "Cat stairs," "Stairs for pets," etc. The retailer is charged for every click, receiving information from the search engine on the word or phrase that generated the charged click.

The broadness of automatic campaigns makes them expensive, so it is desirable, for the sake of economy, to keep them as simple as viable, continuously selecting from the list of clicked words those most promising regarding sale generation, e.g., keywords.

In sequence, the seller launches a specific advertising campaign in the marketplace using that selected list of words, placing a bid (maximum CPC value acceptable to pay) on each of the selected keywords. The marketplace proceeds with a word auction, selecting from the bids (and other metrics related to the seller) the one that will appear in the first place for the customers and returns to the seller with the actual charged value per click for the bid keyword. Appearing before competitors increases the chance of achieving a sale.

The other metrics being equivalent per marketplace criteria, it is obvious that the higher the bid, the higher the chance for the bidder to appear in first place. However, one point to keep in mind is that the higher the bid, the higher the ACoS, such that the difficulty of the decision-making process is to find the fair bidding—the one click cost that balances the extra advertising spending with an adequate increase in sales revenue.

Bidding higher can increase sales, but can also lead to a smaller profit, as the ACoS will be higher and there is no linear relationship between increase in ACoS and increase in sales revenue. It is possible that the net income and the gross margin may become even smaller.

On the other hand, saving on advertising spending by reducing the bid on the marketplace auction can have a great impact on the sales speed and revenue, leaving a smaller profit, reducing the number of sales, and ultimately reflecting adversely on ratings and reviews.

Optimization of the process of designing an advertising campaign, with all its subtleties and mutual influences between intervening factors, is a challenging process. It demands a great deal of attention from the seller, as the purpose is not only to simply guess the fair value for the bid, but also to consider all the involved factors and to come to a fair bidding price—the one that increases the net revenue with as little influence on the gross margin as possible. This optimization for one product in the seller's portfolio on a daily basis demands a lot of work, attention, and skill, and manually performing this optimization daily for hundreds or thousands of products in the seller's portfolio is almost impossible.

SUMMARY OF THE INVENTION

The tool being presented is an automated, or autonomous, optimization process aiming to reduce both the time and cost of achieving a balanced advertising campaign for a product in which the bid for any particular word is automatically calculated such that the ACoS does not exceed a defined value, in percentage points, while achieving predefined sales goals and respecting inventory and budget constraints with no need for human intervention.

The pre-defined ACoS may be either the ACoS for the campaign, which may be defined as the ratio of advertising spending to the advertisement-generated sales volume, or the overall ACoS, i.e., the ACoS for the seller as a whole. The overall ACoS is calculated as the ratio as a percentage between the overall advertising spending of the seller and the total revenue from sales, i.e., both organic sales and advertisement-generated sales.

The present invention optimizes ad spending, autonomously choosing how much to bid on the marketplace for each keyword to generate an amount of sales based on the bid according to CPC/bid behavioral curves. It automatically integrates the purchase and sales process, splitting the sales goals in organic sales goal and ad-generated sales goal.

The proposed tool utilizes a table, available from the marketplace, with all the words used in the automatic campaign, their click-through (if any), and the number of sales generated by those clicks (if any).

Based on the data in this table, the tool selects which words to forego as not promising, and which words to promote and use in a Single Keyword Campaign (SKwC). It also selects which words to watch, keeping them in standby and not foregoing or promoting them in an SKwC until a further increase in the statistical relevance of the word makes a decision possible on whether to negativize or promote it. This process of word selection is preferably fully automated, making it possible to manage the advertising campaign of many UPCs. If desired by the seller, the process can be used in a non-automated manner, in which there is an additional step of manually deciding the action to be taken regarding each word: negativize, promote, or hold in standby.

The results of the automatic campaign generated by the online marketplace are continuously analyzed by comparing the value of the bid, the price paid for each click (CPC), the click-through defined as the ratio of the number of clicks to the number of impressions, the number of sales (NOS) during the campaign, and the ACoS (Advertising Cost of Sale) obtained. If both values, the bid and the actual CPC, are close to each other, no change is taken in the advertising campaign and the campaign is resumed. If there is a significant gap between those values, the system algorithm defines a new value for the bid, smaller than the actual CPC. A new campaign is launched, using the new bid value. The new CPC is recorded, the new actual NOS is retrieved and stored, and the new ACoS is calculated. This cycle continues until there is no significant change in ACoS between two cycles of the campaign.

Moving forward, the system begins calculating both the sales amount obtained through organic sales, i.e., sales that did not happen through paid clicking on the marketplace, and the sales amount obtained through the advertising effort, i.e., advertisement-generated sales.

One of the greatest issues in planning and implementing advertising campaigns in the marketplace is how to increase the efficiency of overall sales respecting an advertising expenditure ceiling and how to consider the influence of this evolution of the sales volume on the inventory, such that the seller will not be overstocked or sell out. This consideration of mutual influences further points to the use of a robust tool to forecast actual sales numbers.

The present invention accomplishes this through a sophisticated statistical analysis of the efficiency of each word in the advertising campaign such that it is possible to forecast, with an acceptable confidence level, how to better assign the desired advertising resources to each word to guarantee the intended sales volume for the relevant UPC.

In general, in one aspect, the invention features a method of producing an advertising campaign of a product for an online marketplace seller including, under control of one or more processors configured with executable instructions, generating at least one automated advertising campaign of a product having an online marketplace listing with an online marketplace; collecting data on one or more keywords used in relation to the at least one automated advertising campaign, the data including an initial set of daily clicks or sales on the online marketplace listing; generating a single keyword advertising campaign of the product, where a single keyword of the single keyword advertising campaign is selected from the one or more keywords at least in part on the basis of the initial set of daily clicks or sales on the online marketplace listing; collecting data on the single keyword used in relation to the single keyword advertising campaign, the data including a second set of daily clicks or sales on the online marketplace listing; executing a machine learning component of an adaptive machine learning platform to generate a machine learning component output, where the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating an optimized advertisement bid value based at least in part on the one or more sales goals and the behavioral curve or table; and generating an optimized advertising campaign of the product based at least in part on the optimized advertisement bid value.

Implementations of the invention may include one or more of the following features. The at least one automated advertising campaign may be generated for use in the online marketplace. The data on one or more keywords used in relation to the at least one automated advertising campaign may further include one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing. The single keyword of the single keyword advertising campaign may be selected from the one or more keywords at least in part on the basis of a conversion rate and an advertising unit cost of sale. The one or more keywords may be one or more of a word, an exact phrase, an exact expression, and combinations thereof. The machine learning component output may be generated at least in part on one or more of a number of impressions relating to the online marketplace listing, a cost per click for the online marketplace listing, a total number of clicks on the online marketplace listing, a conversion rate, a total number of advertisement-generated sales of the product, a total number of organic sales of the product, a total number of sales of the product through the online marketplace listing, and an advertising unit cost of sale.

The method may further include collecting additional data on the single keyword used in relation to the single keyword advertising campaign, the data including a third set of daily clicks or sales on the online marketplace listing; executing a machine learning component of an adaptive machine learning platform to generate a second machine learning component output, where the second machine learning component output is generated based at least in part on the additional data on the single keyword used in relation to the single keyword advertising campaign; generating a second behavioral curve or table relating to an advertisement bid value of the online marketplace listing and a cost per click value associated with the online marketplace listing based at least in part on the second machine learning component output of the machine learning component; generating a second optimized advertisement bid value based at least in part on the one or more sales goals and the second behavioral curve or table; and generating a second optimized advertising campaign of the product based at least in part on the second optimized advertisement bid value. The one or more sales goals may be generated at least in part on the basis of an actual inventory level of the product, a forecasted inventory level of the product, or both. The optimized advertisement bid value may be generated based at least in part on a simulation of a number of sales of the product and an advertising unit cost of sale of the product performed on all available advertisement bid values for all available keywords relating to the product. The single keyword advertising campaign of the product may be generated as including one or more automated safeguards, said one or more automated safeguards including limiting a maximum advertisement bid value in relation to a set value or a value of a sales price of the product. The optimized advertisement bid value may be generated based at least in part on one or more of a target advertising cost of sale, a total number of organic sales of the product, a total number of sales of the product through the online marketplace listing, a total number of organic sales of the product through the online marketplace listing, and a conversion rate of the product through the online marketplace listing.

In general, in another aspect, the invention features a system configured to produce an advertising campaign of a product for an online marketplace seller, including one or more processors, one or more computer-readable media, and one or more modules maintained on the one or more computer-readable media that, when executed by the one or more processors, cause the one or more processors to perform operations including generating at least one automated advertising campaign of a product having an online marketplace listing with an online marketplace; collecting data on one or more keywords used in relation to the at least one automated advertising campaign, the data including an initial set of daily clicks or sales on the online marketplace listing; generating a single keyword advertising campaign of the product, where a single keyword of the single keyword advertising campaign is selected from the one or more keywords at least in part on the basis of the initial set of daily clicks or sales on the online marketplace listing; collecting data on the single keyword used in relation to the single keyword advertising campaign, the data including a second set of daily clicks or sales on the online marketplace listing; executing a machine learning component of an adaptive machine learning platform to generate a machine learning component output, where the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating an optimized advertisement bid value based at least in part on the one or more sales goals and the behavioral curve or table; and generating an optimized advertising campaign of the product based at least in part on the optimized advertisement bid value.

Implementations of the invention may include one or more of the following features. The at least one automated advertising campaign may be generated for use in the online marketplace. The data on one or more keywords used in relation to the at least one automated advertising campaign may further include one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing. The single keyword of the single keyword advertising campaign may be selected from the one or more keywords at least in part on the basis of a conversion rate and an advertising unit cost of sale. The one or more keywords may be one or more of a word, an exact phrase, an exact expression, and combinations thereof. The machine learning component output may be generated at least in part on one or more of a number of impressions relating to the online marketplace listing, a cost per click for the online marketplace listing, a total number of clicks on the online marketplace listing, a conversion rate, a total number of advertisement-generated sales of the product, a total number of organic sales of the product, a total number of sales of the product through the online marketplace listing, and an advertising unit cost of sale.

The system may further include additional operations including collecting additional data on the single keyword used in relation to the single keyword advertising campaign, the data including a third set of daily clicks or sales on the online marketplace listing; executing a machine learning component of an adaptive machine learning platform to generate a second machine learning component output, where the second machine learning component output is generated based at least in part on the additional data on the single keyword used in relation to the single keyword advertising campaign; generating a second behavioral curve or table relating to an advertisement bid value of the online marketplace listing and a cost per click value associated with the online marketplace listing based at least in part on the second machine learning component output of the machine learning component; generating a second optimized advertisement bid value based at least in part on the one or more sales goals and the second behavioral curve or table; and generating a second optimized advertising campaign of the product based at least in part on the second optimized advertisement bid value. The one or more sales goals may be generated at least in part on the basis of an actual inventory level of the product, a forecasted inventory level of the product, or both. The optimized advertisement bid value may be generated based at least in part on a simulation of a number of sales of the product and an advertising unit cost of sale of the product performed on all available advertisement bid values for all available keywords relating to the product. The single keyword advertising campaign of the product may be generated as including one or more automated safeguards, said one or more automated safeguards including limiting a maximum advertisement bid value in relation to a set value or a value of a sales price of the product. The optimized advertisement bid value may be generated based at least in part on one or more of a target advertising cost of sale, a total number of organic sales of the product, a total number of sales of the product through the online marketplace listing, a total number of organic sales of the product through the online marketplace listing, and a conversion rate of the product through the online marketplace listing.

BRIEF DESCRIPTION OF THE DRAWINGS

FIG. 5 shows the expected behavior of the number of sales for a fixed UPC when the selling price is made variable for purposes of learning the pattern modification when there is a change in price as associated with a corresponding variation in the bid value. It is important to note that in order to sell the same number of products, the bid value must change in the same direction as the sales price varies.

FIG. 6 shows a representation of the observed variation of the number of clicks necessary to obtain one order, i.e., clicks to order, of a given UPC. As the sales price of the same UPC varies, the number of clicks to get one order presents a corresponding trend.

FIG. 7 shows the observed variation of the total sales as related to the ratio of CPC/bid. As the ratio of CPC/bid approaches unity, the total number of sales decreases.

FIG. 8 shows the relation between the number of organic sales of a UPC and the variation of the actual ratio of CPC/bid for a given keyword.

FIG. 9 shows the relation between the number of sales by ads for a given keyword of a UPC and the variation of the actual ratio of CPC/bid for that keyword.

FIG. 10 shows the relation between the number of sales by ads of a UPC generated by a specific keyword and the variation of the actual CPC value for that keyword.

FIG. 11 shows the relationship between ACoS expenditure and CPC value.

FIG. 12 shows the relationship between ACoS expenditure and bid value.

FIG. 13 shows a typical relationship between CPC and bid for a given keyword of a UPC, demonstrating the three typical relations of CPC with respect to the bid—an increasing linear relation up to a CPC/bid ratio around 0.90, a near constant value for a CPC/bid ratio of less than 0.50, and a variable relation in between these.

FIG. 14 shows a typical relationship between sales volume (number of sales) and price for a given UPC.

FIGS. 15-16 show the relationship between the bid and number of units sold, and between the bid and the average unit cost of advertising to obtain the number of units sold. The illustrated curves are fundamental to the optimization process of advertising expenditure, combining a basic value that depends only on the seller, e.g., a bid, with the two main variables that are the crux of any selling campaign—the number of units sold and the unitary ad spending to achieve the sales goals.

FIG. 17 shows a typical output of a digital marketing solver (DMS) for a UPC, with two possible solutions.

FIG. 18 shows a typical output of optimization table for a particular UPC, with possible values of the bid, the expected number of expected sales, and the average cost of sale.

Figure 19:
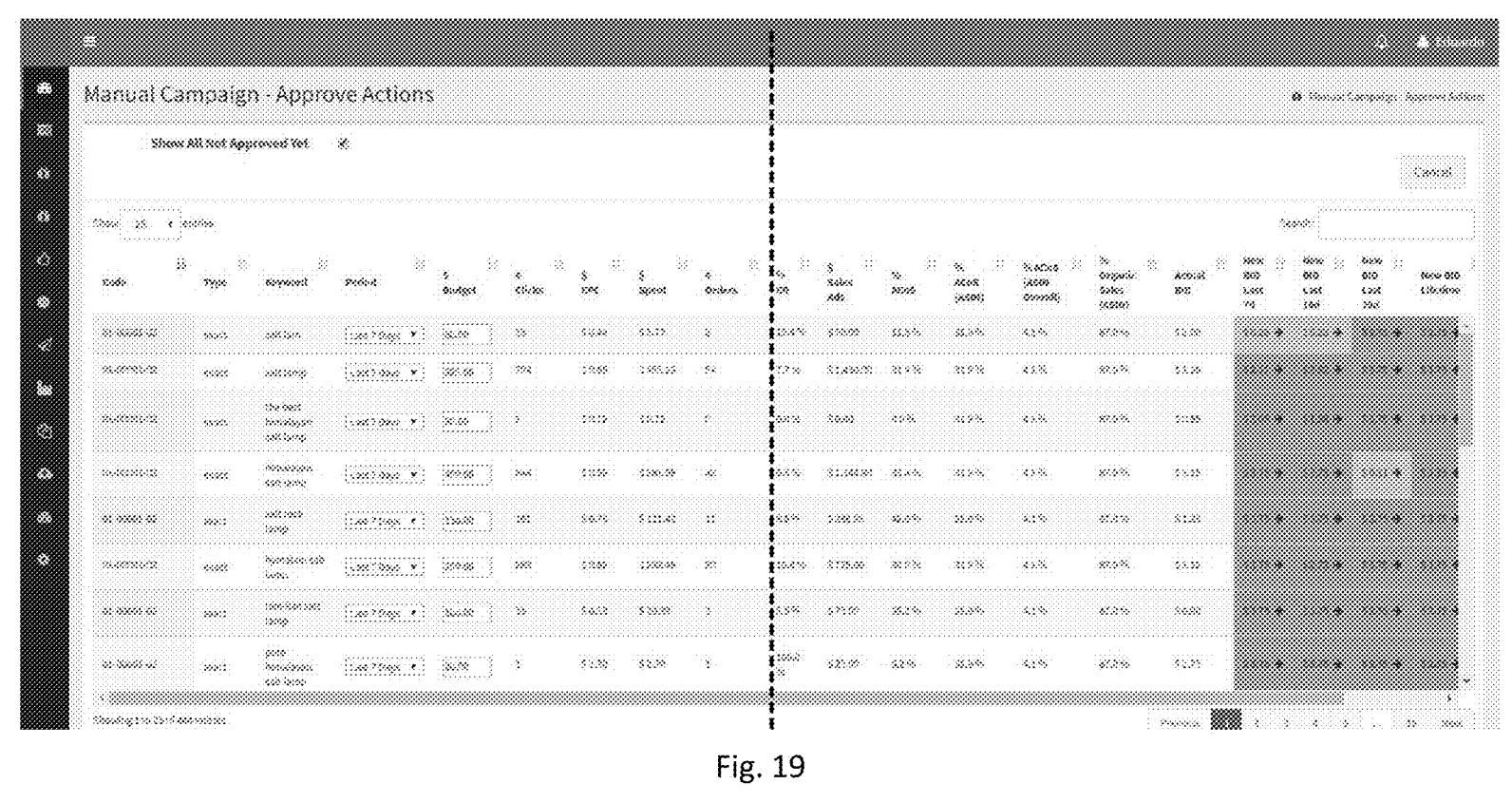

FIG. 19 shows a typical output of a DMS for a UPC, with suggestions of new bid values and capability to change the bid value according to one embodiment of the present invention.

DETAILED DESCRIPTION OF THE INVENTION

Figure 1:
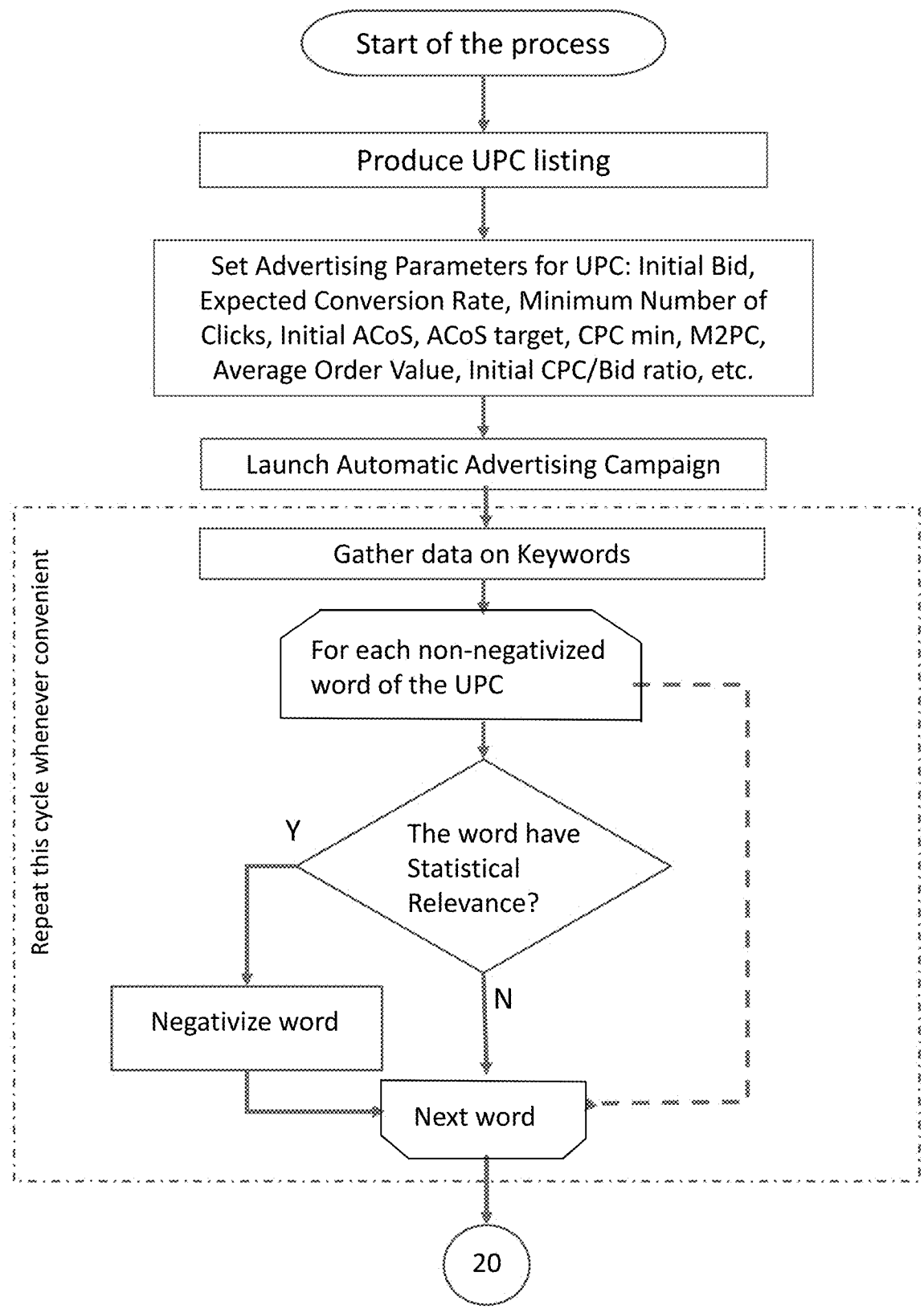
FIGS. 1-4 show a schematic flowchart of the optimization process, including the data gathering process and the operations to achieve optimization of the capital expenditure in keywords campaign for a given UPC. This optimization is made through the automatic analysis of the results of automatic campaigns and subsequent automatic launching of exact type keywords advertising campaigns.
Figure 2:
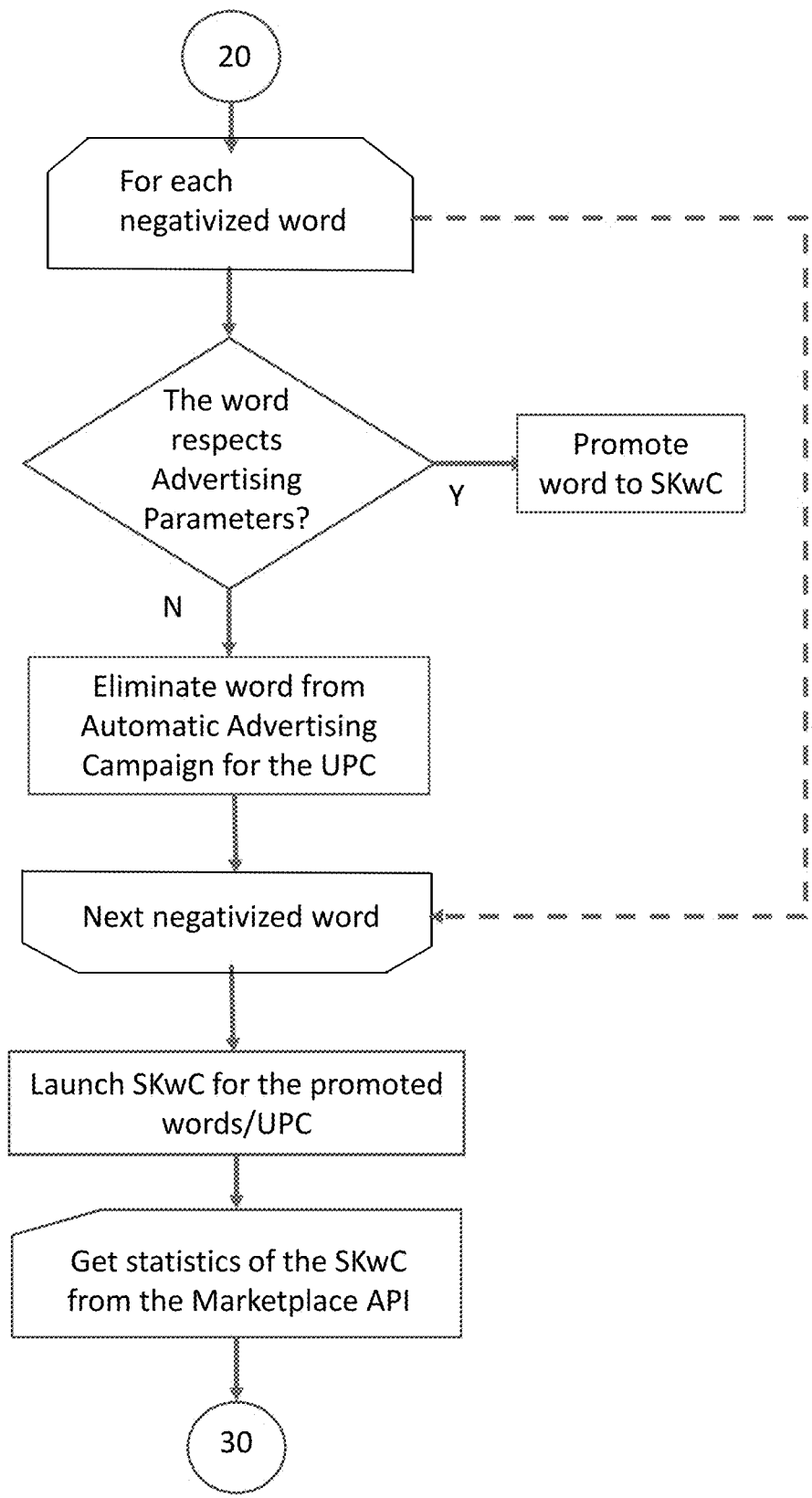
Figure 3:
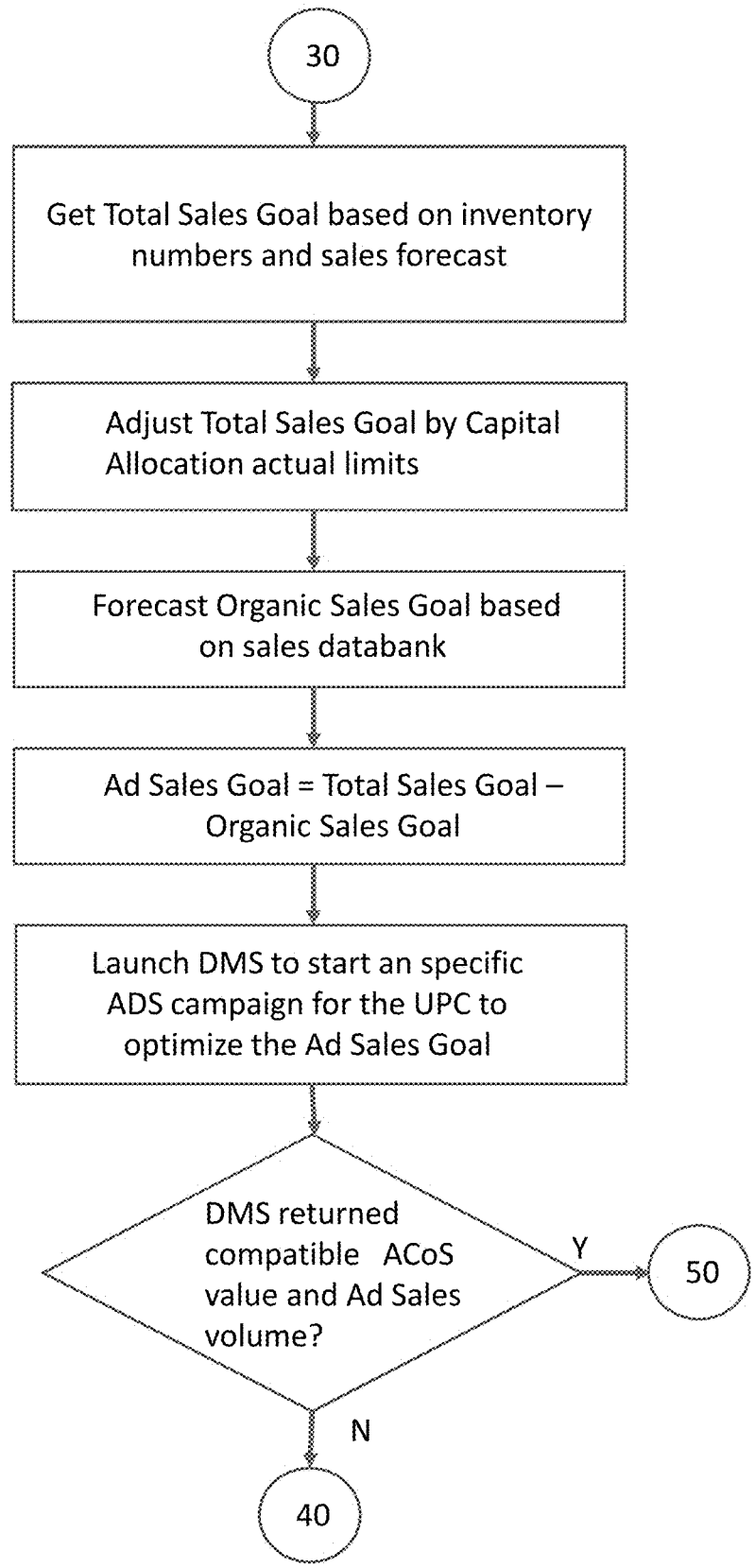
Figure 4:
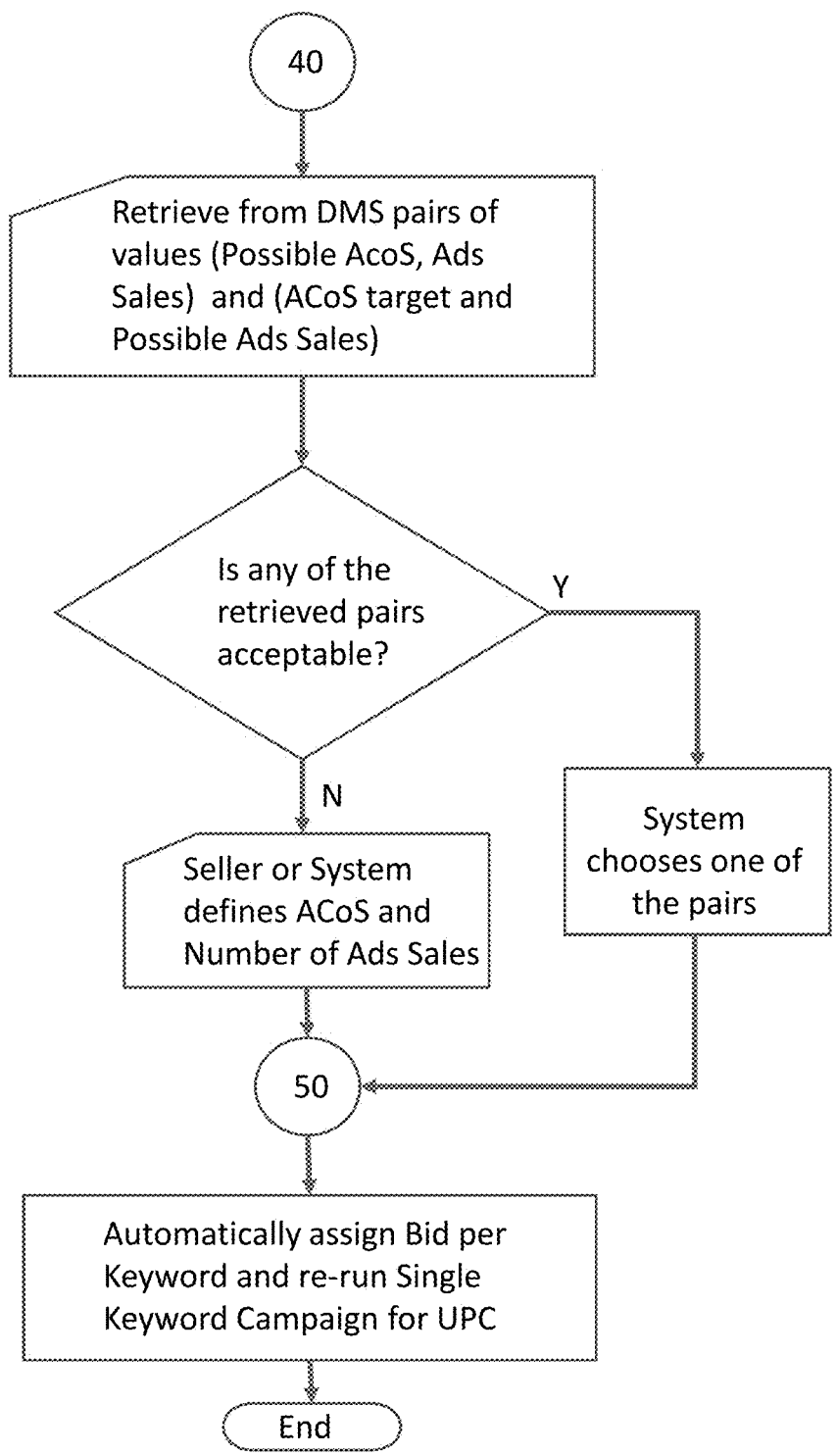

The present invention is directed to optimizing and automating the advertising expenditure in online-based commerce, i.e., e-commerce, by achieving an optimized sales volume and sales speed of a UPC with the smallest viable spending in advertising campaigns in marketplaces while respecting the actual and forecasted inventory level of that UPC. It can also be directed to optimizing and automating the advertising expenditure in online-based commerce, i.e., e-commerce, by achieving a target ACoS value with the maximum total number of sales for a UPC while respecting the actual and forecasted inventory level of that UPC.

Direct advertising in e-commerce essentially consists of bidding for relevance, e.g., appearing before competitors, on the search engine lists. This task must consider two main linked actions:

1. Choosing the most suitable words, e.g., keywords, to converge the search for the subject UPC of the advertising campaign; and
2. Achieving a fair value of CPC to meet the sales goals (value and speed) with an ACoS as small as viable, or respecting a target ACoS value (calculated either in relation to advertisement-generated sales or in relation to overall sales of the seller in the online marketplace) while achieving the corresponding maximum total number of sales of the UPC.

The choice of words referenced above is critical to the process, as advertising campaigns for new products typically start with no information on which words will capture the customers truly interested in the UPC and not in similar products or products thinly linked to the subject product.

Usually, with no information on which are the "best" words, the process starts with the launching of an automatic campaign, where a search engine suggests a wide array of words chosen by some proprietary criteria unknown to the seller.

Search engines usually charge per click, and thus their goal is to launch an automatic campaign with the broadest set of words related to the UPC, as it is unknown in advance which words will attract the attention of the customer with all clicks being charged. For instance, for the product "Pet Stairs," a click can be obtained, among others, through the words: "Pet," "Stairs," "Pet Stairs," "Dog stairs," "Stairs for pets," "pet food," "pet leashes," "wood stairs," "stairs gate," etc. Some of these words and phrases are pertinent while others are not. The retailer is charged for any click in every word during the automatic campaign, receiving information from the search engine on which word or words specifically generated the charged clicks.

The broadness of automatic campaigns can make them very expensive, so it is desirable, for the sake of efficiency, to streamline the list of words. A typical method is to start with an automatic campaign and then to select from the list of clicked words those most promising regarding sale generation.

When optimizing an advertising campaign of an existing product on the marketplace, it is preferable to narrow the automatic campaign producing a description of the UPC based on descriptions used by popular sellers of that product on the marketplace.

This invention directed to the optimization of capital allocation in advertising campaigns may include some or all of the following steps. The steps are presented herein as preferred steps according to one embodiment of the present invention.
1. Product Listing;
2. Automatic Campaign;
3. Word Screening;
4. Single Keyword Campaigns;
5. Behavior Curves;
6. Analysis of Organic Sales×Ranking×Total # of Sales;
7. Bid×Organic Sales×ACoS Target;
8. Sales Goals;
9. Digital Marketing Solver; and
10. Capital Allocation.

These steps need not be present in every use of this invention, and may be grouped, merged, split, ordained, or arranged in different ways. The steps, variables, and parameters that are involved in the calculations for selling a UPC in the marketplace will be described in sequence.

Product Listing

Selling a new product starts with the product listing (naming and description) on a specific webpage or marketplace. It is preferable to research and study the public listings already used by popular sellers of the product to make this listing more attractive and appealing to potential customers. Based on this study, it is possible to produce a better adapted and more efficient listing of the product.

It is good practice to keep improving the description of the product. By establishing a routine of utilizing knowledge relating to the words acquired in the advertising campaigns, it is possible to continuously upgrade the description of the product in a positive feedback loop.

Automatic Campaign

With the listing of the product in hand (naming and description created), the next step is to launch a fully automatic campaign, where the marketplace decides to whom to show the product.

This campaign provides key information on which words were effectively used by potential customers to search for the UPC.

The search engine also provides, for each clicked word, data on the number of impressions, number of clicks (NOC), click-through rate (CTR), conversion rate (CVR), number of sales (NoS), value of sales (VaS), advertising expenditure, etc.

The main goal of this campaign is to identify which search terms were used and associated data (bid, CPC, NOC, CVR, etc.) to classify the words as either efficient or inefficient.

Each word stays on the list for as long as it has no statistical significance or relevance. As soon as there is sufficient data to assure statistical significance or relevance, the word may be expelled from the automatic campaign.

It is possible to automate the ending of an automatic campaign.

Word Screening

Once any word in the automatic campaign achieves a statistical significance or relevance, a decision must be made on such word based on the gathered data, chiefly the expected daily number of clicks. The decision is to:
1. Promote the word to a Single Keyword Campaign (SKwC);
2. Keep the word in the automatic campaign; or
3. Exclude the word from any further advertising campaign for this UPC.

A word will progress to an SKwC when the number of clicks, the conversion rate, and the ACoS forecast good selling performance.

If not excluded, a word will stay in the automatic campaign while complying with any automated exclusion criteria that can be arbitrarily defined by the seller. The excluded words do not receive any further automatic campaign resources. Decisions relating to prospective use of any of the words can be fully automated in the present invention.

Launching a SKwC demands a definition of the bid and the daily advertising spending, i.e., a budget, for the ads platform, which can also be fully automated in the present invention.

The expression keyword herein refers to one of three elements: a single word, an exact phrase, or an exact expression.

Once the CVR of a keyword is assumed as known, and the target ACoS is set, the bid that theoretically generates that ACoS is determined by a statistical analysis of the data provided by the marketplace for the SKwC.

After the SKwC has run for a sufficient duration (days or number of clicks, whichever generates more statistical relevancy, or any other criterion defined by the seller), an analysis is performed to determine a minimum CPC value (CPCmin) that defines whether that word is viable or not. For example, the following equation may be utilized: $CPCmin = CVRexp \times Unit\ Sales\ Price \times ACoStarget$, where $CVRexp$ is the expected CVR for the SKwC object of the advertising campaign of the UPC, and $ACoStarget$ is the maximum ACoS accepted for the SKwC object of the advertising campaign of the UPC (usually as only one value for all keywords relating to the product).

Based on all available data, the system automatically calculates the minimum acceptable CPC (M2PC), which, in one embodiment of the present invention, is the largest CPC from a set of the smallest 10% of CPC of all keywords. This is often approximately $0.20.

CPCmin is the CPC below which there is no interest in the keyword. It is the smallest value of CPC that makes it possible to achieve the ACoStarget in light of the expected sales price and CVRexp.

By comparing M2PC with CPCmin, an automated decision on the keyword is generated in the following manner:
If $M2PC \geq CPCmin$, then the SKwC is abandoned or negativized; and If M2PC<CPCmin, then the SKwC is validated.

As this word screening process does not consider the semantics or meaning of words, the process can be used in and for any language regarding the automated selection of those words to promote or negativize. In one embodiment of the present invention, the process is used to automatically select words in Japanese.

Single Keyword Campaigns

SKwC starts with a bid as previously described, which may respect certain arbitrary safety rules. In an embodiment of the present invention, one of these safety rules states that a maximum bid must be not greater than 7% of the sale price and $10.00.

To consider how the marketplace reacts to changes in the bid, it is preferable to have a spectrum of modifications in the variables previously mentioned as related to variations in the bid value. To avoid the inconvenience of minor variations in the automated new bid value, there may exist off-set criteria. In one embodiment of the present invention, the following criteria is used as an off-set to the new bid value:

|new bid−last bid|≥$0.03, where the seller may adjust/set this monetary value; and

|1−(new bid/last bid)|≥3.5%, where the seller may adjust/set this percentage.

The next step is to perform an analysis of behavior and interrelationships between bid, CPC, CTR, CVR, and NOC, aimed at forecasting the number of sales (NOS) and the CVR based on the value of the bid, and vice versa.

This process starts by finding the behavioral curve that the keyword and the UPC fit best. These behavioral curves are analogous to clusters that predict the relationship between bid, NOS, and average ad cost of sales (AdCS) for UPCs and keywords that have a similar performance in the marketplace (i.e., a "Look Alike" method). These clusters are defined through utilizing machine learning and artificial intelligence with respect to the seller's stored information on bids, sales, CPC, CVR, and NOC.

Important variables on these behavioral curves include the volume of searches and the level of bidding competition because less liquid products/keywords tend to have a big spread between CPC and bid, presenting discontinuities, while more liquid products/keywords behave more smoothly, adjusted to the models.

The keyword correspondence type (e.g., broad, phrase, or exact) should be respected, as CVR, volumes, and CPCs vary with the correspondence type. It is suggested, particularly in the early stages of the SKwC, to work with the exact type of correspondence and then adjust the correspondence to the other types if there is no solution respecting the ACoS target. Exact type SKwCs tend to behave better when compared to the expected behavior.

The idea may be to control the budget or total ads spending based on the bids, but there should exist a budget value ceiling as a safety net. For some words having less predictable behaviors, including those limits in less liquid situations, setting a budget can prove to be an indispensable management tool.

This invention also permits manual insertion of keywords based on private research, intuition, or determination of the seller.

The initial bid to start this SKwC can be defined by many different criteria but should incorporate the CPCmin and M2PC variables previously described. The method of the present invention herein described is typically applied to UPCs already in the market, with an existing bid that can be utilized as the initial bid.

Behavior Curves

Each keyword, as relating to a specific UPC, behaves in a certain way regarding the relationship between the bid, CPC, NOC, CVR, and AdCS. For any specific UPC and at one set price point, it is possible to define sets of different curves by plotting the relationships of NOC and bids and CVR and bids against the CPC/bid ratio.

These curves can be drawn to cluster the number of clicks and the conversion rates in any number of brackets, usually with at least three brackets. In one embodiment of the present invention, both variables are clustered in five brackets each, such as to provide 25 curves.

This relationship shows that the number of clicks and the conversion rate are the most important variables in determining the quality of a forecast for the relationship between bids, CVR, and NOS for a keyword on a specific CPC/bid relationship. The more a keyword is clicked or searched, the better the fit of the forecasts. Moreover, the higher the CVR, the more accurate the forecast.

The NOC is directly related to the ratio of CPC/bid, with an NOC for a CPC=0.75×bid being a good benchmark. In one embodiment of the present invention, the brackets for the NOC are [1, 15], [16, 45], [46, 100], [101, 300], [>300].

CVRs can be set in any number of brackets. In one embodiment of the present invention, the CVRs are set to very low, low, medium, high, and super high.

Both limits of the NOC and the CVR brackets can be freely selected by the seller at the setup of the process, according to the seller's experience or intuition. It is important to note that these curves are simply an auxiliary tool, which may or may not be used by the seller. All the values extracted from these curves can be obtained using a suitable data-crunching software, primarily when there is a sufficient volume of data on a given UPC.

These curves are also obtained through the use of machine learning software over the recorded behavior data of every keyword for each UPC. In one embodiment of the present invention, the data stored includes impressions, bids, CPC, NOC, ad spending, VOS, number of sales, ACoS, organic sales, etc. By crunching and analyzing this data, important relationships between the number of units sold and the average advertising cost of sale are established as functions of the bid alone, illustrated in FIGS. 15-16, which show the behavior of two keywords related to two different UPCs. The stored data on the advertising/selling dynamics may be used directly rather than using the referenced curves.

Figure 15:
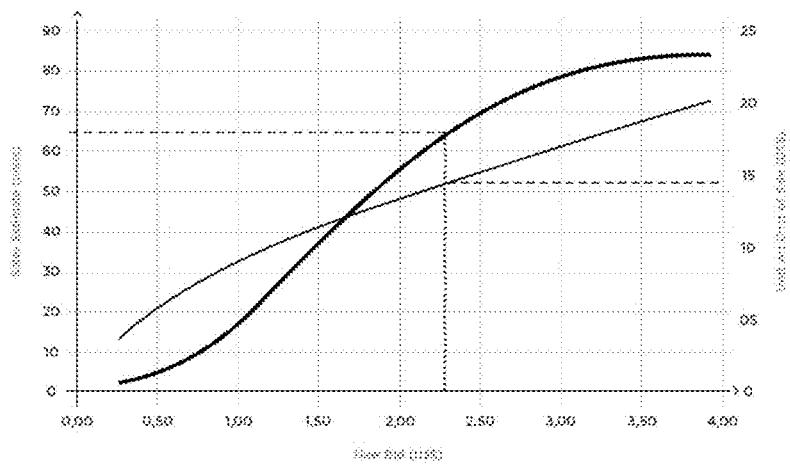
Figure 16:
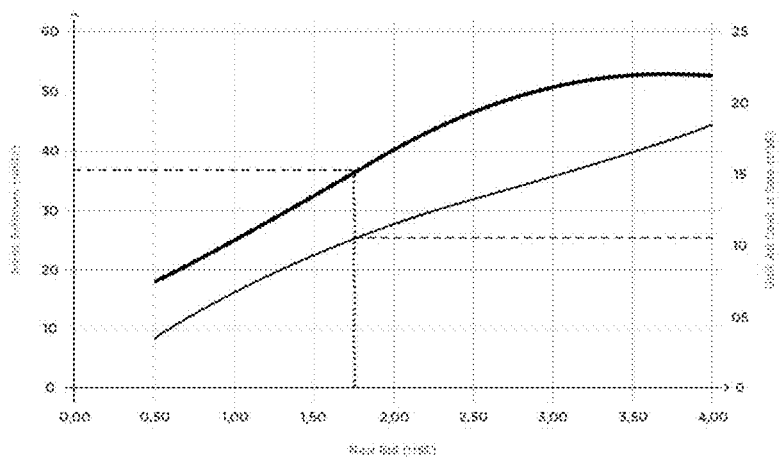
Figure 20:
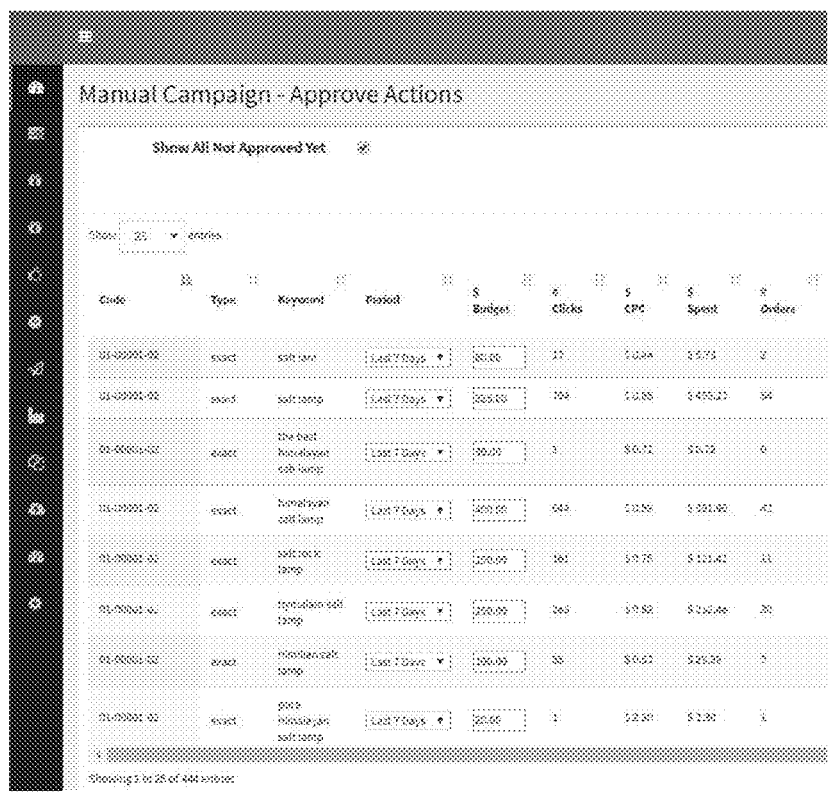
FIG. 20 shows an enlarged view of a portion of the typical output of a DMS according to one embodiment of the present invention.
Figure 21:
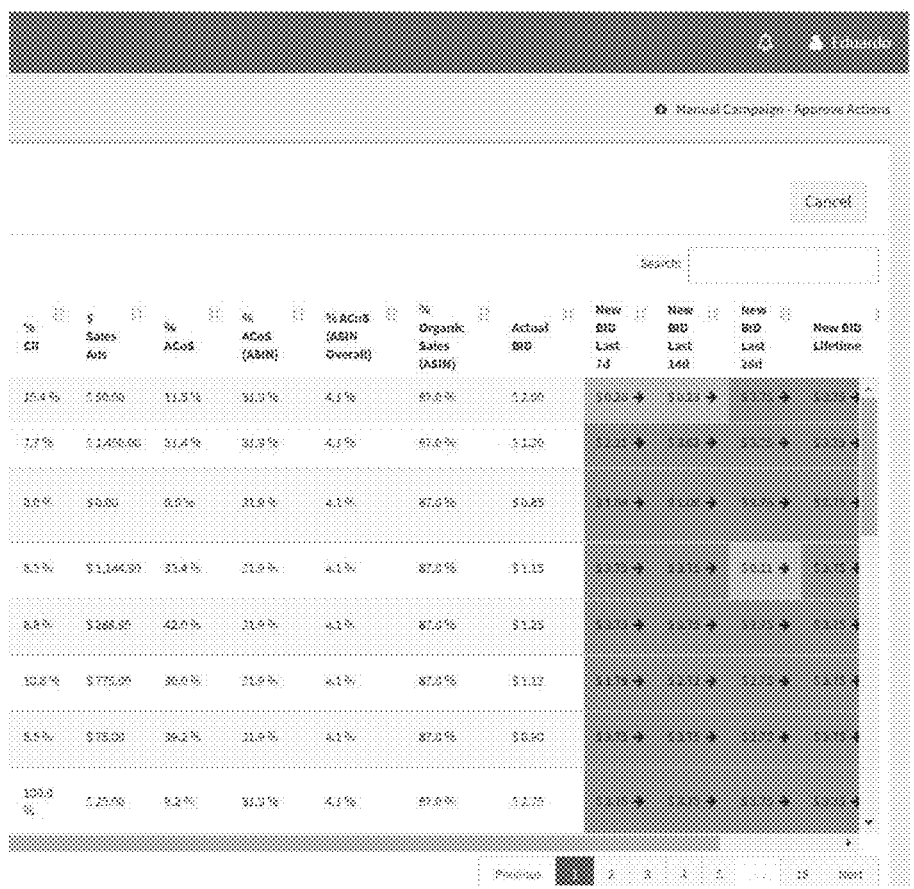
FIG. 21 shows an enlarged view of a portion of the typical output of a DMS according to one embodiment of the present invention.
Figure 22:
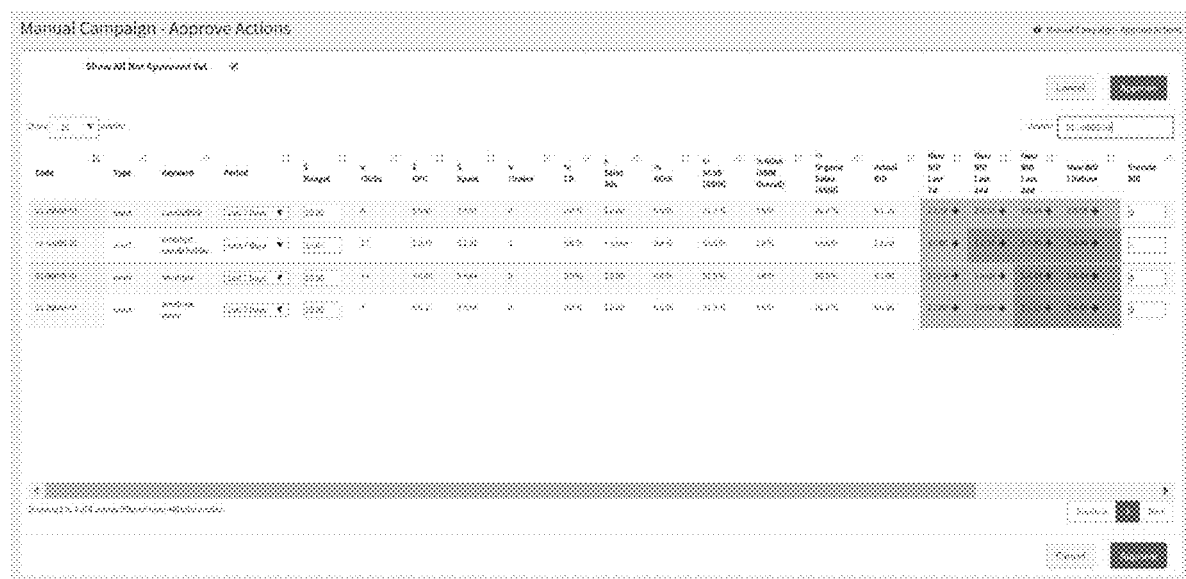
FIG. 22 shows the DMS solution for a specific UPC, an amethyst candle holder, according to one embodiment of the present invention.

FIG. 15 shows that a bid of $2.35 brings 65 daily unit sales with an average ad cost of order of $14.20. For the keyword illustrated in FIG. 16, a bid of US $1.75 produces 36 daily unit sales with an average ad cost of order of US $10.50.

There is an optimal region regarding a bid, the number of clicks, and the conversion rate obtained. Determining the most efficient combination of the bid, CVR, and NOS for each word is key for the present invention to achieve the optimal advertising expenditure solution for the portfolio.

Through continuous data collection and recording, the curves improve over time, increasing their reliability as the UPC achieves a better ranking position, more reviews, and becomes more established in each marketplace.

There are two different and opposing goals in an advertising campaign in the marketplace—the marketplace's goal and the seller's goal. The marketplace's goal is to charge the seller as much as possible through the maximum number of clicks from marketplace visitors and, if possible, charge the whole daily advertising amount defined by the seller for the advertising campaign, i.e., budgeted amount. This goal of maximum charging has no explicitly direct relationship with the conversion rate generated by clicking. On the other hand, the seller's goal is to have the maximum number of sales with the least amount of advertisement spending, respecting the forecasted inventory level, and having the paid clicks as effective as possible.

Ad spending can be segmented, assigning different spending amounts according to the hour of the day, to the day of the week, and to specific periods of the year to account for existing patterns of spending from visitors. These patterns are learned through the use of machine learning. When adopting this segmentation, the present invention can automatically vary the budget to match these patterns. This variation capability can also be used to accommodate seasonality, for instance.

The system may update its knowledge of the marketplace algorithms (MKaG), such that each time a new behavioral pattern is found, the pattern's characteristics are automatically incorporated into the system and used to define the utilized bid/budget segmentation.

The present invention allows the seller to lower the bid in incremental steps to test the MKaG, for the purpose of determining whether there is a value below which the product is either not shown or appears less as a sponsored ad.

If, for a given bid, the system detects that the MKaG does not show the product anymore, the system itself may increase the bid according to certain defined offset rules to determine the smallest bid guaranteeing a product will be shown again.

The actual process is not linear, but the system can provide tracking, with certain parameters being monitored. When the conversion rate is high, the product tends to be shown again, even with no increase in the bid or budget, as the MKaG detects a fair likelihood that a purchase will happen. Thus, there is a fair likelihood to earn the referral fee, even with a reduction in the advertising income.

Even with the system operating to lower the bid values, the ads may still appear in a good position in the marketplace. This appearance can happen when the MKaG determines that the closest competitor has a small conversion rate, with a high likelihood of limiting revenue of the marketplace only to the ads spending with little to no likelihood of earning the referral fees.

Searches for "dog bed" and "bed for dogs" can produce entirely different orders of search result appearances as a result of online marketplace algorithms' utilization of revenue produced by the seller as a "relevance factor." The number of organic sales achieved by the seller for a given UPC is one of the most relevant factors in determining the relevance of the seller in the marketplace for that UPC. Online marketplaces focus on sales, both because of expected revenue and customer experience, and accordingly prioritize presenting products with the highest likelihood of selling, including based on the key aspect of how much the product actually sold when the relevant search term was used.

This behavior is recorded and used as input to machine learning software to establish ways to increase conversion rates and decrease ACoS by creating continuously-updating optimization procedures to determine the minimum value to bid.

The system may also determine times of the day to stop or pause the campaign. This action is aimed at trying to mislead the marketplace algorithms in their goal of charging the total daily advertising budget defined by the seller.

At the end of the ad spending period, supposing that the seller's bid is very low, including zero, there is a difficult decision for the MKaG to make:

1. To promote the seller's ads to a more highlighted position with very low, possibly zero, ad income, but increasing the chances of the seller's impression being clicked and converted into a sale (therefore incurring the referral fee) in light of the good conversion rate presented by the seller; or
2. To ignore this probability and maintain the ad from the seller on a much lower position, showing the ad from another seller highlighted, even with a smaller conversion rate, thereby securing much smaller ad income. This decision lowers the likelihood of a referral fee which is greater than the ad income.

The system continues testing different bids to gather data and may use a "Look Alike" system analysis to categorize keywords in forming clusters, even with incomplete information. This "Look Alike" system analysis is a powerful tool, as it allows the use of information collected on different keywords as one set. This approach allows for gathering more data to be crunched, as all data on every "Look Alike" word is treated as a data on any keyword in the "Look Alike" set. This leads to a better forecast of the behavior of each word in the "Look-Alike" set, resulting in more efficient management of the advertising budget.

Organic Sales×Ranking×Total # of Sales

Organic sales can be defined as the difference between total sales and advertised (paid) sales, i.e., advertisement-generated sales. Organic sales do not impact on ad expenditure, which is calculated based solely on the advertised sales. In fact, organic sales lower the ACoS overall, which is obtained as the ratio between the total expenditure and the total number of sales.

It is known that the higher the ranking position and the total number of sales, the greater the organic sales. The shrinking of organic sales is usually greater than the loss of the ranking position in a non-linear way.

The system learns to predict both the ranking position of the UPC based on historical sales and the organic sales based on recorded values, such as ranking position, actual total sales values (both relative or absolute), time series, etc.

For example, if a UPC is selling 30 units a day with a ranking of #100 and the forecast is to sell 40 units a day in 20 days from now, the system knows that the ranking position will improve, for example, to a ranking of #70.

The system calculates that if this UPC was selling 30 units a day (13 advertised sales and 17 organic sales) and is forecasted to sell 40 units in 20 days, there will be an increase in organic sales of 5 units a day, from 17 daily units to 22 daily units. As the forecasted number of sales is 40 daily units, and the organic sales account for 22 daily units, the new goal for the advertisement optimizer is 18 daily unit sales. A similar analysis may be performed with respect to a decrease in the expected sales.

An innovative feature of the present invention is the utilization of organic sales as a basic factor in the intended attainment of a seller's ACoS, either the ACoStarget for the product campaign or the overall ACoStarget. The present invention newly permits placement of a target on ACoS spending for the seller, making it possible to better analyze the behavior of a company as a whole, thereby facilitating all commercial and business analyses, such as with respect to gross margin calculations.

Bid×Organic Sales×ACoS Target

In relation to the present invention, an innovative, direct, non-intuitive behavioral relationship was found between the bid, the sales price (SP), the organic sales (OS), the ACoStarget, and the conversion rate (CVR). In one embodiment of the present invention, bid and sales price are in monetary units and ACoStarget, conversion rate, and organic sales are in percentages. The expression ACoStarget encompasses both the ACoStarget for the product campaign and the overall ACoStarget.

Once the ACoStarget is known or provided, the bid to be used in the advertising campaign is expressed by the following formula: bid=SP×ACoStarget×CVR/(1-OS). This formula is balanced, as when the organic sales value increases, the bid value increases. This results in more effective advertising campaigns, which in turn increases advertisement-generated sales, as with greater bids more auctions are won. Particularly, as more auctions are won, greater relevance is generated, leading to a rising number of clicks and consequently an increase in advertisement-generated sales. The increase in advertisement-generated sales leads to a decrease in organic sales, with organic sales being the difference between total sales and advertisement-generated sales, which decreases the bid value. Relatedly, a smaller bid decreases advertisement-generated sales, which then increases organic sales. This bid value formula has not been shown in any other process or method for managing advertising campaigns that utilize organic sales in the bid calculation.

The system has been shown to tend to an equilibrium point making possible to achieve a desired ACoStarget, either for the product campaign or overall. This oscillatory process presents great comparability to a dampening process, quickly converging the bid values to a substantially fixed value.

Figure 23:
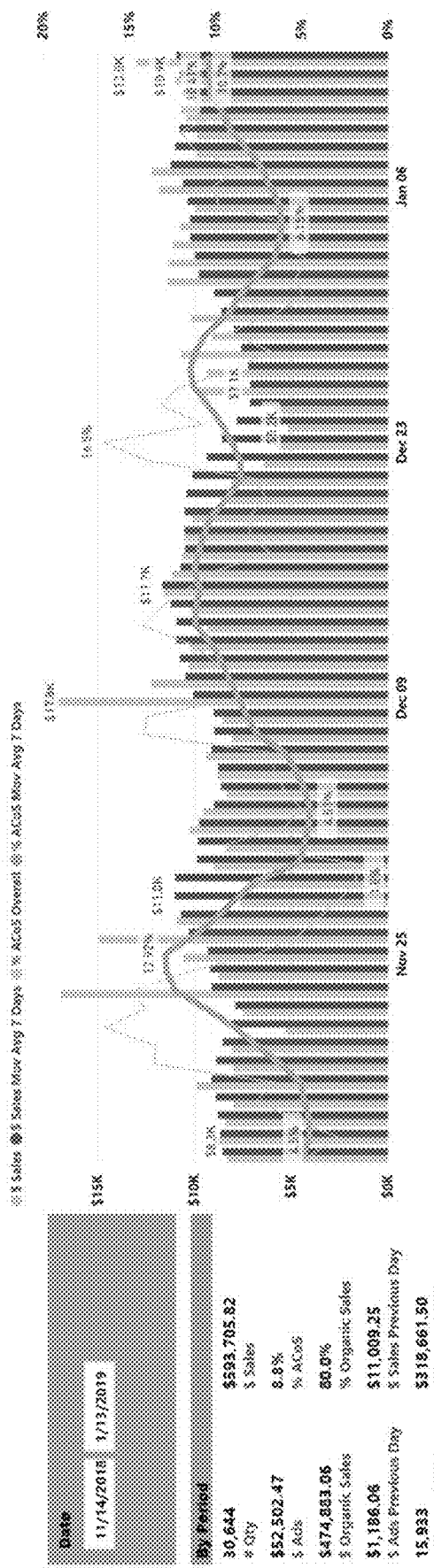
FIG. 23 shows a graphical representation illustrating variation of sales volume and overall ACoS for an exemplary entity, as well as a self-balancing aspect of the present invention in which a dampening effect may be observed.

FIG. 23 shows the relationship between sales volume and overall ACoS for an example company. On the left side of FIG. 23, there are values for certain aspects determined over a 59-day period, these aspects including volume of sales, advertising spending, and organic sales, both in terms of money units and as a percentage. The previously-described self-balancing behavior may be observed in the graph on the right side of FIG. 23, particularly showing that when the ACoS increases, the sales volume decreases, and vice versa.

The calculated bid is considered a primary bid, as it can be affected by certain normalizing factors, to account for seasonality (in the day, week, month, and year), placement, maximum bid value accepted, etc. As the statistical relevance of the number of sales increases, the value of the maximum acceptable bid also increases, based on a greater certainty relating to organic sales. In one embodiment of the present invention, when the number of sales in the last 7 days is equal to or greater than 30, the maximum acceptable bid can increase up to 35% of the sales price.

As previously stated, the process of the present invention may be entirely automated, with no need for any human selections or decisions.

Sales Goals

There should be a formal definition of the sales goals, e.g., volumes, speed, etc. The sales goals will beacon the optimization process, taking into account the inventory's actual and forecasted levels.

In the basic scenario, the main input to be considered is an automated forecast generated by any acceptable methodology. The formal sales goals can be set constant, aimed at selling exactly what is presently sold or aimed at a defined sales growth (positive or negative).

Imposed restrictions on the sales goal creates the stability demand of the sales/purchases process. These artificially-imposed restrictions bring the necessary boundary conditions and planning capabilities to stabilize the sales goals.

The sales goals should be clearly stated as a composition of organic sales and advertised sales, where the sum of these two values is the total sales.

Digital Marketing Solver (DMS)

A Digital Marketing Solver (DMS) is a process that automatically defines the optimum bid values to be used to reach the sales goals—the number of sales, the maximum ACoS, or a combination thereof. DMS may require the following inputs:
1. The desired value of sales (Xdes) based on ads, sales forecasts and inventory information as major inputs;
2. The maximum acceptable value of ACoS, which can vary over time; and
3. The complete information of the behavior curves.

It is to be noted that DMS seeks a low ACoS that guarantees the Xdes, respecting a confidence level. Based on Xdes, DMS simulates the possible scenarios, i.e., every possible bid in every keyword for that UPC, and chooses the one scenario, i.e., one defined bid value for every keyword, leading to Xdes with the lowest ACoS, thus optimizing the advertising expenditure. These decisions can also be automated to follow rules set by the seller at the setup of the process.

For example, if Xdes is 20 units, maximum ACoS is set at 27%, and DMS finds a solution that generates sales of 20 units with an ACoS≤27%, DMS will implement the solution. If DMS is not able to find a solution respecting both boundary conditions (Xdes and maximum ACoS), DMS will return two pairs of values—one respecting the maximum ACoS with the corresponding achievable total number of sales, and the other respecting the number of sales with the corresponding ACoS, as illustrated in FIG. 17. The seller may then choose from these two solutions.

The retailer may also choose something in-between, such as an ACoS of 30% and 18 unit sales. The purpose is to guarantee that the seller always understands the impact on organic sales resulting from his or her selections. As previously discussed, the system presents automatization capabilities of this decision based on parameters set by the seller.

DMS is a versatile tool, allowing for simulations and making it possible for the user to test different scenarios in understanding the impact of the decisions on organic and total sales.

DMS may also be used as a simulator to forecast the number of total sales in new or ramping UPCs. In one embodiment of the present invention, an automatic campaign runs for 21 days. Based on the data collected during this 21-day period, DMS informs the seller what could be the maximum sales goals using the set budget and what should be the budget to achieve other sales goals. This is an important feature for the DMS, making it a valuable planning tool for launching or improving products in the marketplace.

When the system runs all curves of ACoS and NOS, there may be rules established by the user that determine and produce points of interest, with different relations for number of units sold and ACoS. These points of interest are pairs of values of NOS and ACoS that do not obey either of the initially imposed constraints (Xdes and maximum ACoS) but present interesting solutions worthy of consideration in light of actual inventory levels and capital availability. For example, in a situation where Xdes is asking for 17 units and a maximum ACoS of 24% and DMS finds a solution with a sale of 15 units and an ACoS of 18%, meaning that a 25% reduction in the ACoS will only result in an 11.8% reduction in the number of sales, DMS may bring this information to the user's attention and/or ask for an answer. This decision can also be automated through adopting parameters accounting, e.g., for the impact on organic sales.

Given a keyword related to a UPC, the output from DMS may be a table or a curve, with the expected ACoS and the forecasted NOS of the UPC for every bid for that particular keyword.

The optimum solution may result in some keywords having a bid of zero. A long-tail strategy can be implemented for keywords that would have a low value bid, e.g., a bid of $0.30 in 28 keywords expected to generate 0.37 clicks per day per word with a good conversion rate. This situation presents the classic long-tail strategy that is only feasible with automated systems. A small or very large portion of the sales may rely on this strategy, usually generating an extremely low ACoS and consequently improved gross margins.

Depending on the commercial strategy of the seller, it is also possible to automatically eliminate keywords with small numbers of sales in order to concentrate attention and resources on only those keywords with high returns.

Allocating more ad spending to the keywords that generate the most sales does not guarantee more sales. The system learns which are the economical limits of number of sales of each keyword such that increasing the ad expenditure over that limit simply increases the ACoS without any expectation of increasing the number of sales accordingly.

In the example described in FIG. 18, to achieve a goal of 8 advertised sales with a maximum ACoS of 28%, the bid should be $1.00 on Keyword1 and $0.70 on Keyword2. This bidding should be the most economically efficient way of obtaining the 8 advertised sales. These bid values lead to an ACoS of 18.60%, with an ad spending of $37.20, or 0.186× $25.00×8. The average cost of sale will be $4.65 per unit, or $37.20/8. If 30 advertised sales per day is desired, it is recommended to bid $1.50 on Keyword1 and $1.25 on Keyword2, increasing the ACoS to 25.80%, with an ad spending of $193.50, or 0.258×$25.00×30. The average cost of sale will be $6.45 per unit, or $193.50/30. This average cost of sale for selling 30 units is 38.7% greater than the previous average cost of sale when the seller volume is only 8 units. If the seller is overstocked, it could be advantageous to spend more than 38.71% per sale to solve the inventory problem.

Alternatively, if desired, one can use the concept of average cost of order instead of the average cost of sale, as the ad spending is calculated per click and not per order, and one order can produce a sale of more than one unit.

Obviously, the relative profitability and return on investment (ROI) relating to a daily sales speed of 30 units will differ from that relating to a daily sales speed of 8 units.

Figure 5:
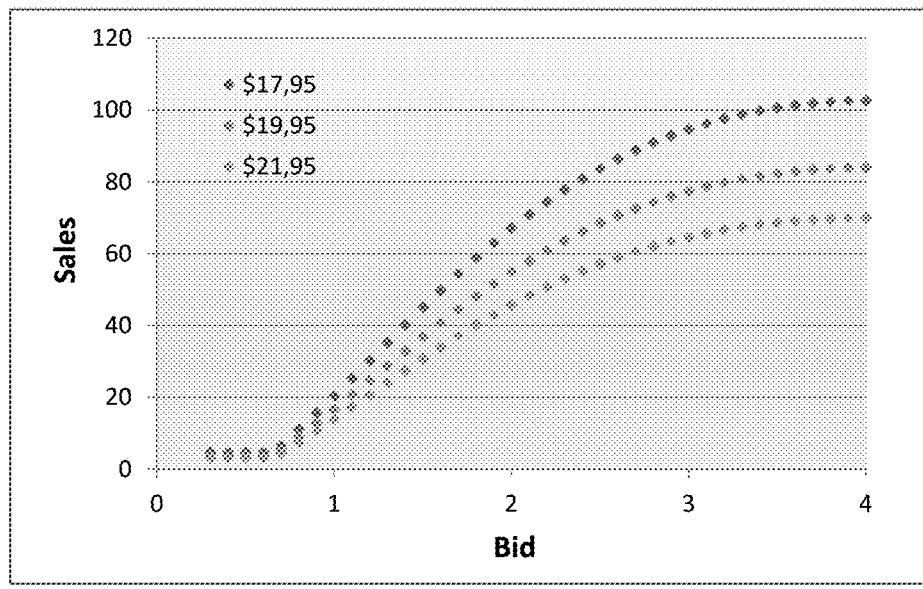
FIGS. 5-16 include data from registers of selling and advertising operations, related to several UPCs, in marketplaces. Unless otherwise mentioned, these figures refer to the behavior of either one UPC or one word for a given UPC.
Figure 6:
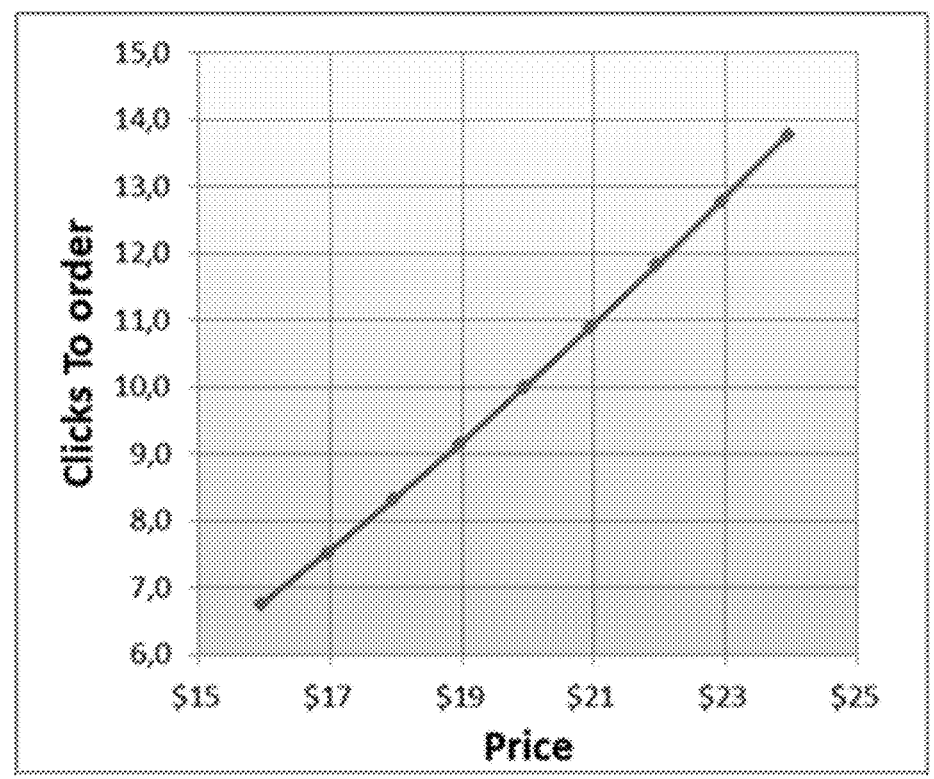
Figure 7:
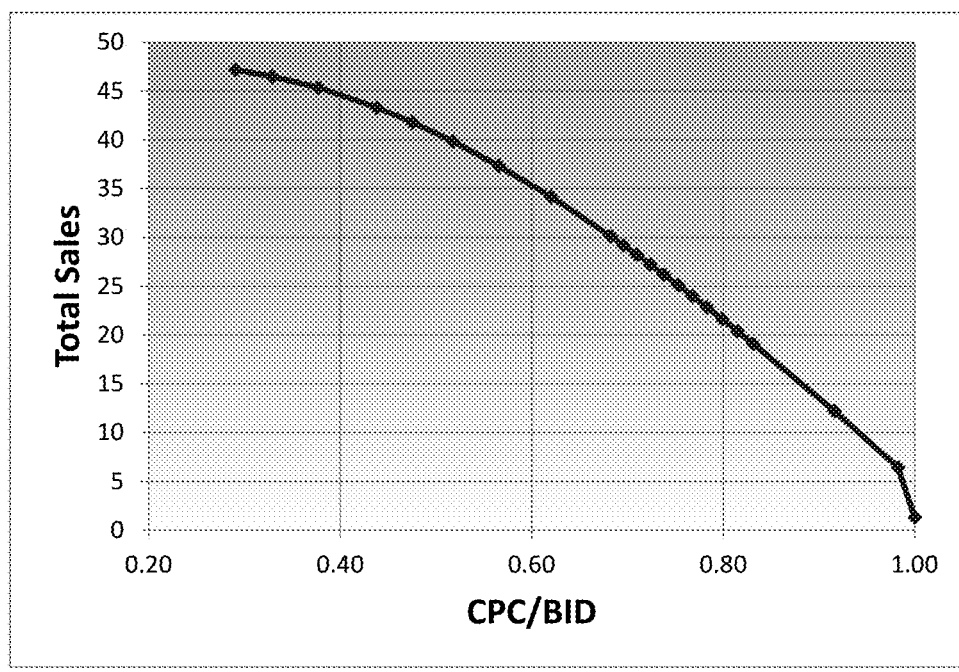
Figure 8:
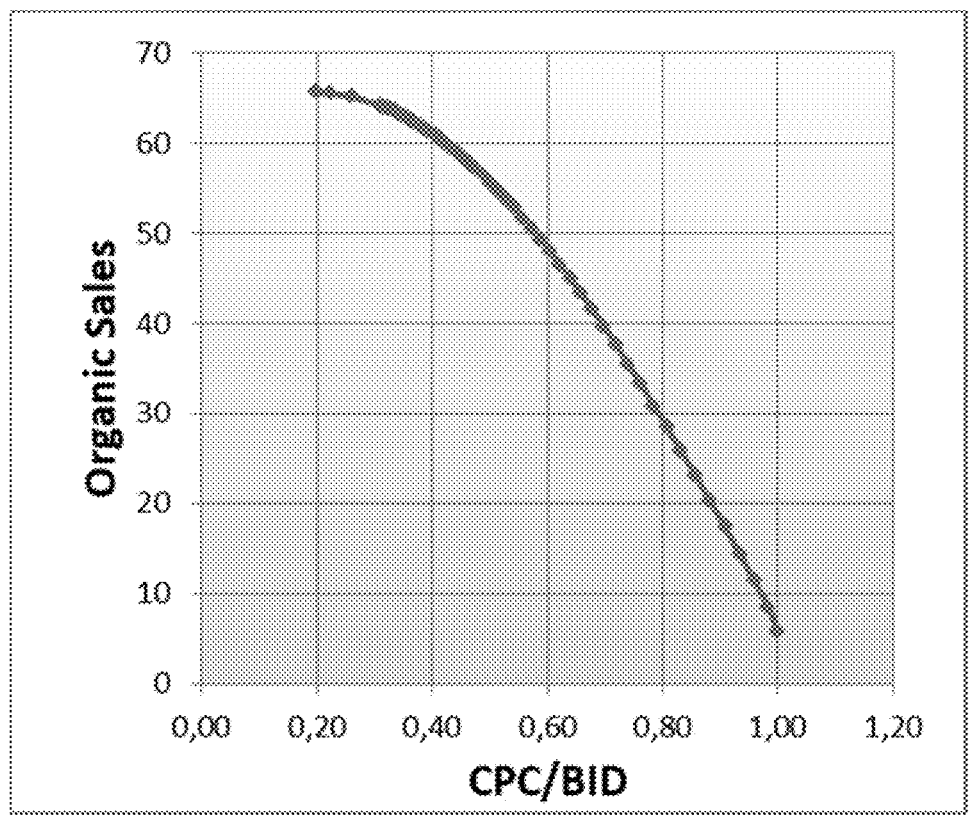
Figure 9:
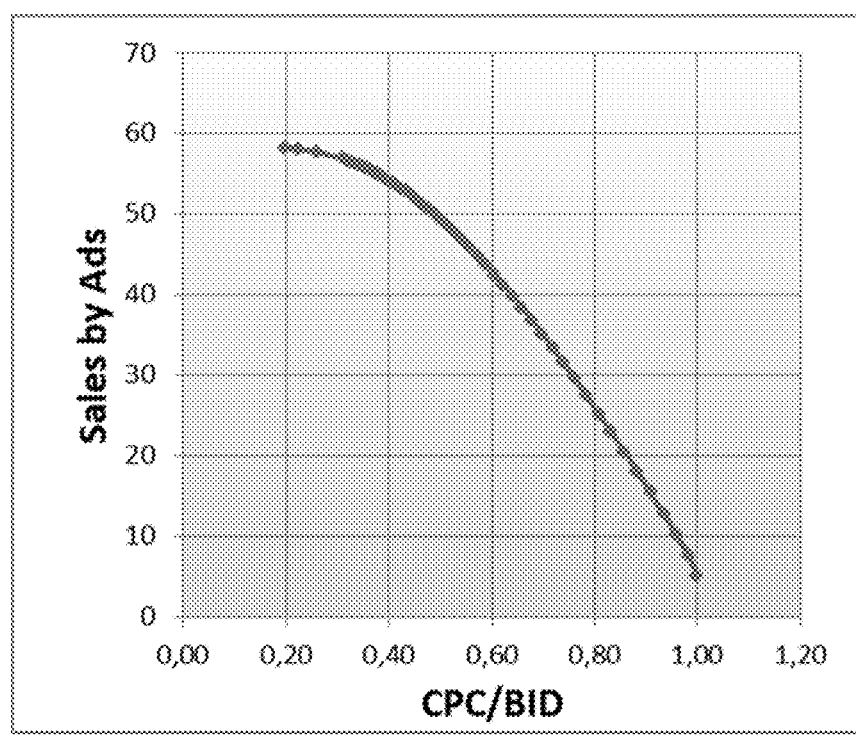
Figure 10:
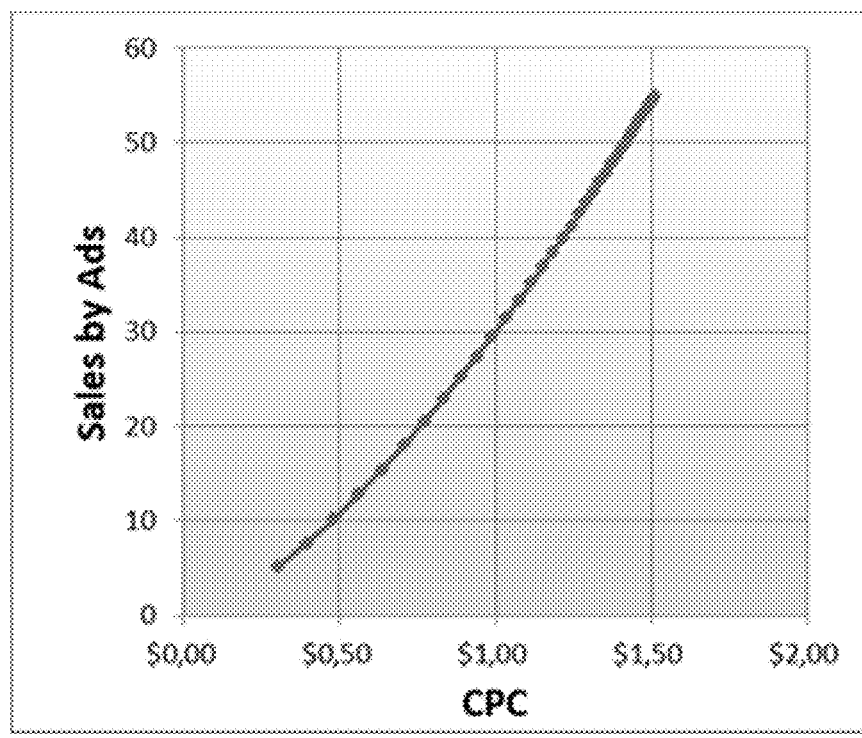
Figure 11:
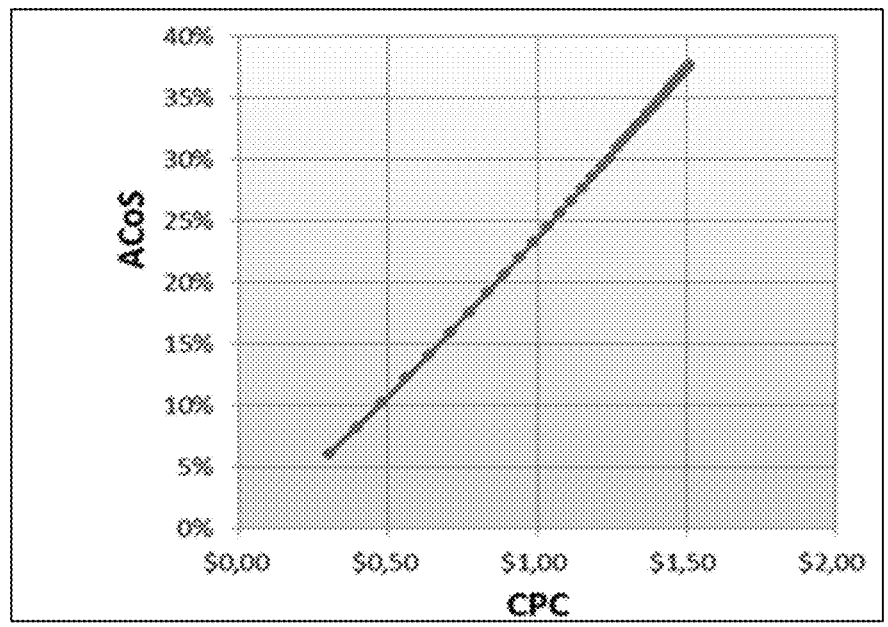
Figure 12:
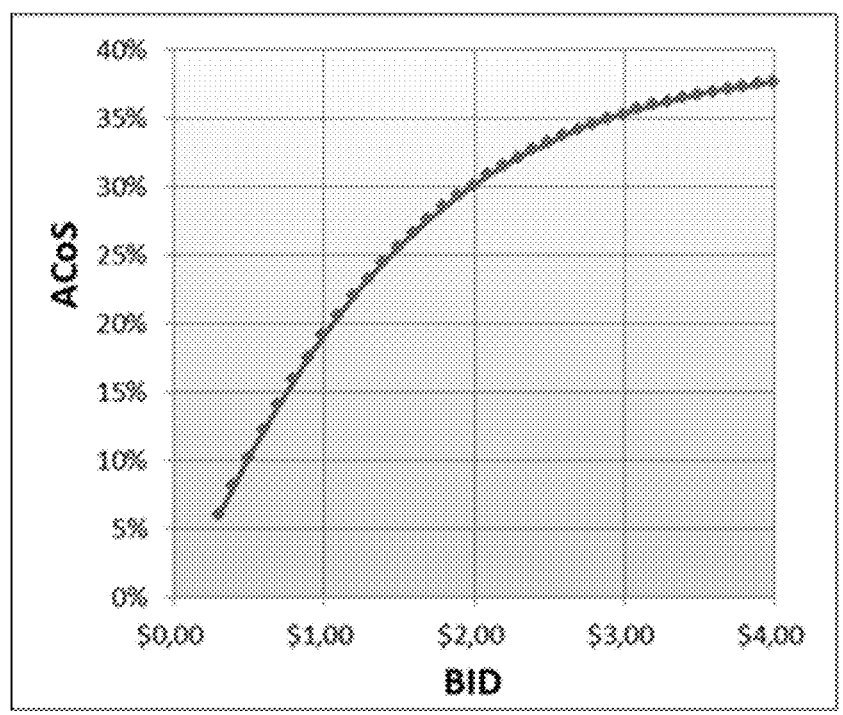
Figure 13:
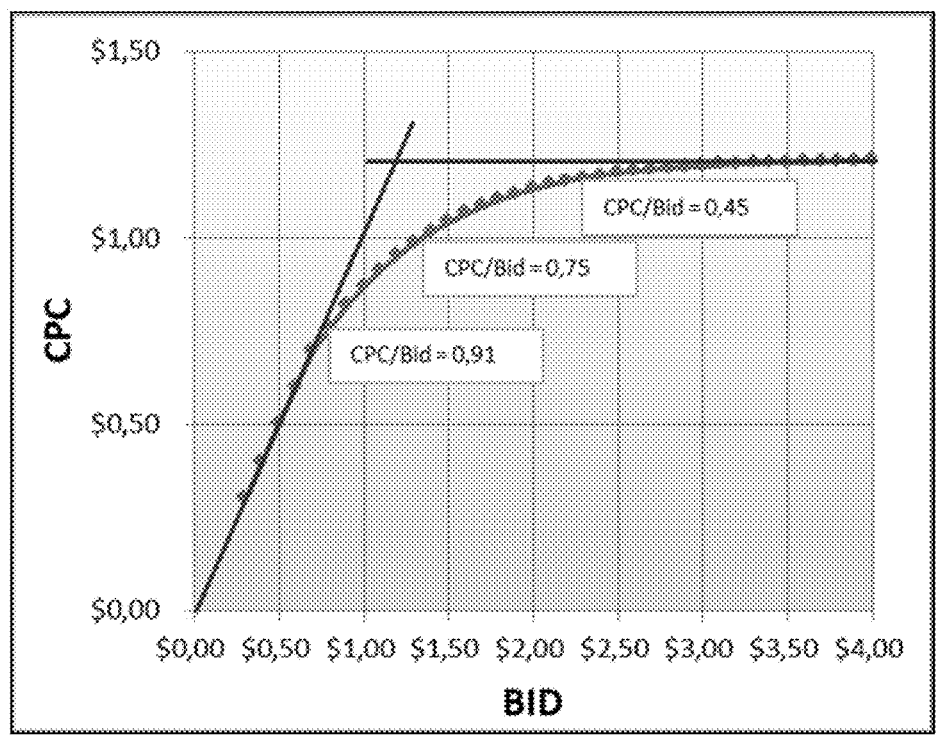
Figure 14:
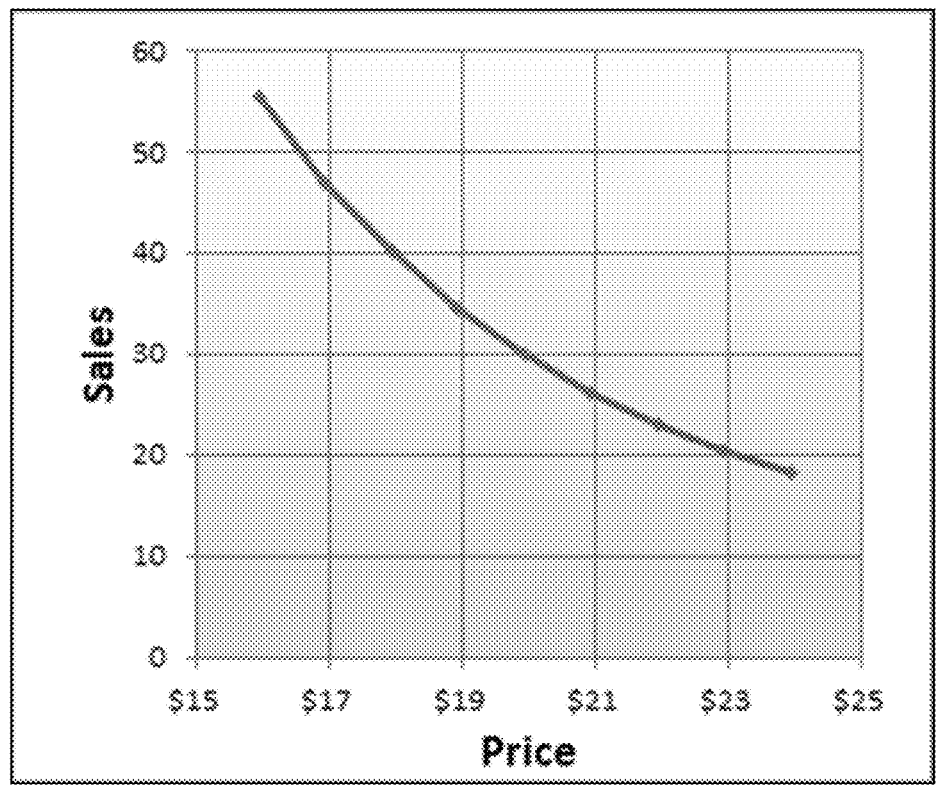

DMS can also handle price elasticity considerations, as it is simple to modify and simulate different sales prices for the same UPC to understand the behavior and mutual influences of the variables, e.g., bid, number of total Sales, number of ad sales, ACoS, etc. This kind of information is valuable with respect to defining the desired ROIs, margins, and inventory levels. FIGS. 5, 6, and 14 each show aspects related to sales price elasticity.

Capital Allocation

The capital allocation may be decided by choosing which words to bid on and the value of each bid. It is possible to prioritize products to be sold in the portfolio based on either gross margin or ROI. Sales of products can be accelerated with a better margin/ROI or decelerated with lower levels of margin and ROI. These numbers can be adjusted by reducing or increasing the ACoS, which produces a more efficient allocation of capital.

There may be safety controls in place that would reduce ads spending and sales speed to account for inventory level constraints when there is no available capital or time for new purchases to arrive in the warehouses.

By decreasing the ACoS, not only is there a decrease in the capital allocated in inventory but also an increase in margins and ROI, improving the cash flow accordingly.

Variation of Bids

The system is continuously gathering data on the variation of the conversion rates (CVR), bid, number of clicks, total sales, advertisement-generated sales, organic sales, and ACoS. The associated data processing enables the system to automatically decide on variation of the bid values with any desired time interval in order to optimize the ACoS or the sales goals.

The automated process of defining the bids described above can be further improved to allow for an automatic variation of the bid value according to the month of the year, the week of the month, the day of the week, the hour of the day, etc. If the online marketplace has a placement policy, i.e., top of search, end of search, etc., the system adjusts the bid values to consider this new set of boundary conditions.

Product Targeting

The present invention can also be used to analyze and optimize product targeting for sale of the UPC using the same process used for discovering those keywords that generated positive results. The same technique can be applied to automatically determine those other products for which comparison is beneficial. Once these other products are identified, the present invention may automatically create product target campaigns using these identified products as targets for the advertising campaigns.

The identification of these target products follows the same method as the keyword identification process, but with one key initial difference: The word screening is performed by analyzing data obtained from the list of words generated by the automatic campaign, and the product targeting is performed by analyzing data relating to the list of comparable products made available by the online marketplace. Other than this difference, the reasoning behind the process is the same. Through the relevant data processing, such as with the goal of understanding conversion rate behavior, those patterns of categories to target or avoid may be determined, specifically in an automated way with no need for human intervention.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

What is claimed is:

1. A method of automatically producing an advertising campaign of a product for an online marketplace seller, the method performed by an application including one or more programs of instruction embodied in a non-transitory computer readable medium and executable by a processor to configure the application, comprising:

generating at least one automated advertising campaign of a product having an online marketplace listing with an online marketplace;

collecting data on one or more keywords used in relation to the at least one automated advertising campaign, the data including an initial set of daily clicks or sales on the online marketplace listing;

generating a single keyword advertising campaign of the product, wherein a single keyword of the single keyword advertising campaign is selected from the one or more keywords at least in part on the basis of the initial set of daily clicks or sales on the online marketplace listing;

collecting data on the single keyword used in relation to the single keyword advertising campaign, the data including a second set of daily clicks or sales on the online marketplace listing;

executing a machine learning component of an adaptive machine learning platform to generate a machine learning component output, wherein the machine learning component output is generated based at least in part on the data on the single keyword used in relation to the single keyword advertising campaign;

generating a behavioral curve or table relating to an advertisement bid value of the online marketplace listing and a cost per click value associated with the online marketplace listing based at least in part on the machine learning component output of the machine learning component;

generating one or more sales goals of the product for the online marketplace seller on the online marketplace;

generating a current advertisement bid value based at least in part on the one or more sales goals and the behavioral curve or table;

generating a current advertising campaign of the product based at least in part on the current advertisement bid value; and generating an optimized advertisement bid value by continuously adjusting the current advertisement bid value until the current advertisement bid value has reached an optimized value, the continuous adjustment being performed by:

collecting data on the current advertising campaign, the data including a set of sales on the online marketplace listing;

generating an adjusted advertisement bid value based at least on one of the data relating to the current advertising campaign, the one or more sales goals and the behavioral curve or table; and generating an optimized advertising campaign of the product based at least in part on the adjusted advertisement bid value.

2. The method of claim 1, wherein the at least one automated advertising campaign is generated for use in the online marketplace.

3. The method of claim 1, wherein the data on one or more keywords used in relation to the at least one automated advertising campaign further includes one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing.

4. The method of claim 1, wherein the single keyword of the single keyword advertising campaign is selected from the one or more keywords at least in part on the basis of a conversion rate and an advertising unit cost of sale.

5. The method of claim 1, wherein the one or more keywords are one or more of a word, an exact phrase, an exact expression, and combinations thereof.

6. The method of claim 1, wherein the machine learning component output is generated at least in part on one or more of a number of impressions relating to the online marketplace listing, a cost per click for the online marketplace listing, a total number of clicks on the online marketplace listing, a conversion rate, a total number of advertisement-generated sales of the product, a total number of organic sales of the product, a total number of sales of the product through the online marketplace listing, and an advertising unit cost of sale.

7. The method of claim 1, further comprising:

collecting additional data on the single keyword used in relation to the single keyword advertising campaign, the data including a third set of daily clicks or sales on the online marketplace listing;

executing a machine learning component of an adaptive machine learning platform to generate a second machine learning component output, wherein the second machine learning component output is generated based at least in part on the additional data on the single keyword used in relation to the single keyword advertising campaign;

generating a second behavioral curve or table relating to an advertisement bid value of the online marketplace listing and a cost per click value associated with the online marketplace listing based at least in part on the second machine learning component output of the machine learning component;

generating a second optimized advertisement bid value based at least in part on the one or more sales goals and the second behavioral curve or table; and generating a second optimized advertising campaign of the product based at least in part on the second optimized advertisement bid value.

8. The method of claim 1, wherein the one or more sales goals are generated at least in part on the basis of an actual inventory level of the product, a forecasted inventory level of the product, or both.

9. The method of claim 1, wherein the optimized advertisement bid value is generated based at least in part on a simulation of a number of sales of the product and an advertising unit cost of sale of the product performed on all available advertisement bid values for all available keywords relating to the product.

10. The method of claim 1, wherein the single keyword advertising campaign of the product is generated as including one or more automated safeguards, said one or more automated safeguards including limiting a maximum advertisement bid value in relation to a set value or a value of a sales price of the product.

11. The method of claim 1, wherein the optimized advertisement bid value is generated based at least in part on one or more of a target advertising cost of sale, a total number of organic sales of the product, a total number of sales of the product through the online marketplace listing, a total number of organic sales of the product through the online marketplace listing, and a conversion rate of the product through the online marketplace listing.

12. A system configured to automatically produce an advertising campaign of a product for an online marketplace seller, comprising:

one or more processors;
one or more non-transitory computer-readable media; and
one or more modules maintained on the one or more non-transitory computer-readable media that, when executed by the one or more processors, cause the one or more processors to perform operations including:
  generating at least one automated advertising campaign of a product having an online marketplace listing with an online marketplace;
  collecting data on one or more keywords used in relation to the at least one automated advertising campaign, the data including an initial set of daily clicks or sales on the online marketplace listing;
  generating a single keyword advertising campaign of the product, wherein a single keyword of the single keyword advertising campaign is selected from the one or more keywords at least in part on the basis of the initial set of daily clicks or sales on the online marketplace listing;
  collecting data on the single keyword used in relation to the single keyword advertising campaign, the data including a second set of daily clicks or sales on the online marketplace listing;
  executing a machine learning component of an adaptive machine learning platform to generate a machine learning component output, wherein the machine learning component output is generated based at least in part on the data on the single keyword used in relation to the single keyword advertising campaign;
  generating a behavioral curve or table relating to an advertisement bid value of the online marketplace listing and a cost per click value associated with the online marketplace listing based at least in part on the machine learning component output of the machine learning component;
  generating one or more sales goals of the product for the online marketplace seller on the online marketplace;
  generating a current advertisement bid value based at least in part on the one or more sales goals and the behavioral curve or table;
  generating a current advertising campaign of the product based at least in part on the current advertisement bid value; and
  generating an optimized advertisement bid value by continuously adjusting the current advertisement bid value until the current advertisement bid value has reached an optimized value, the continuous adjustment being performed by:
    collecting data on the current advertising campaign, the data including a set of sales on the online marketplace listing;
    generating an adjusted advertisement bid value based at least on one of the data relating to the current advertising campaign, the one or more sales goals and the behavioral curve or table; and
    generating an optimized advertising campaign of the product based at least in part on the adjusted advertisement bid value.

13. The system of claim 12, wherein the at least one automated advertising campaign is generated for use in the online marketplace.

14. The system of claim 12, wherein the data on one or more keywords used in relation to the at least one automated advertising campaign further includes one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing.

15. The system of claim 12, wherein the single keyword of the single keyword advertising campaign is selected from the one or more keywords at least in part on the basis of a conversion rate and an advertising unit cost of sale.

16. The system of claim 12, wherein the one or more keywords are one or more of a word, an exact phrase, an exact expression, and combinations thereof.

17. The system of claim 12, wherein the machine learning component output is generated at least in part on one or more of a number of impressions relating to the online marketplace listing, a cost per click for the online marketplace listing, a total number of clicks on the online marketplace listing, a conversion rate, a total number of advertisement-generated sales of the product, a total number of organic sales of the product, a total number of sales of the product through the online marketplace listing, and an advertising unit cost of sale.

18. The system of claim 12, further comprising additional operations including:
  collecting additional data on the single keyword used in relation to the single keyword advertising campaign, the data including a third set of daily clicks or sales on the online marketplace listing;
  executing a machine learning component of an adaptive machine learning platform to generate a second machine learning component output, wherein the second machine learning component output is generated based at least in part on the additional data on the single keyword used in relation to the single keyword advertising campaign;
  generating a second behavioral curve or table relating to an advertisement bid value of the online marketplace listing and a cost per click value associated with the online marketplace listing based at least in part on the second machine learning component output of the machine learning component;
  generating a second optimized advertisement bid value based at least in part on the one or more sales goals and the second behavioral curve or table; and
  generating a second optimized advertising campaign of the product based at least in part on the second optimized advertisement bid value.

19. The system of claim 12, wherein the one or more sales goals are generated at least in part on the basis of an actual inventory level of the product, a forecasted inventory level of the product, or both.

20. The system of claim 12, wherein the optimized advertisement bid value is generated based at least in part on a simulation of a number of sales of the product and an advertising unit cost of sale of the product performed on all available advertisement bid values for all available keywords relating to the product.

21. The system of claim 12, wherein the single keyword advertising campaign of the product is generated as including one or more automated safeguards, said one or more automated safeguards including limiting a maximum advertisement bid value in relation to a set value or a value of a sales price of the product.

22. The system of claim 12, wherein the optimized advertisement bid value is generated based at least in part on one or more of a target advertising cost of sale, a total number of organic sales of the product, a total number of sales of the product through the online marketplace listing, a total number of organic sales of the product through the online marketplace listing, and a conversion rate of the product through the online marketplace listing.

* * * * *